J. R. PEIRCE.
BOOKKEEPING MACHINE.
APPLICATION FILED AUG. 9, 1907.

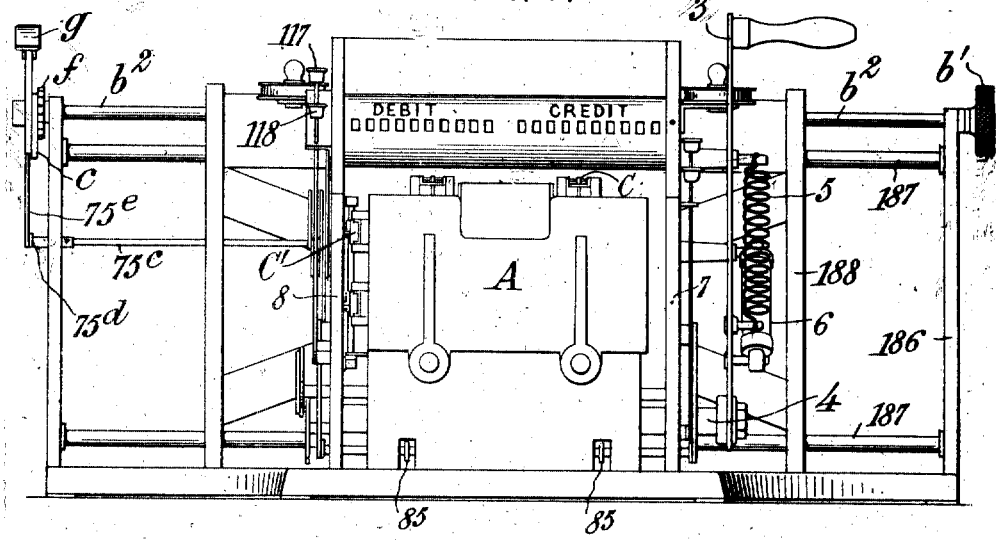
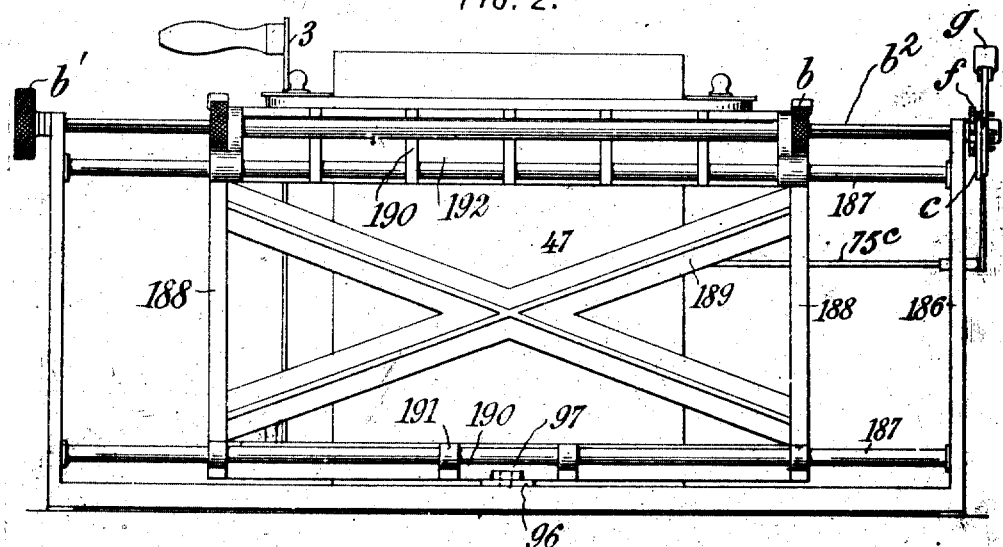

1,233,699.

Patented July 17, 1917.
18 SHEETS—SHEET 2.

WITNESSES:
Fred White
René Bruigg

INVENTOR:
John Hoyden Peirce,
By Attorneys,

J. R. PEIRCE.
BOOKKEEPING MACHINE.
APPLICATION FILED AUG. 9, 1907.

1,233,699.

Patented July 17, 1917.
18 SHEETS—SHEET 3.

WITNESSES:

INVENTOR:
John Royden Peirce
By Attorneys

J. R. PEIRCE.
BOOKKEEPING MACHINE.
APPLICATION FILED AUG. 9, 1907.

1,233,699.

Patented July 17, 1917.
18 SHEETS—SHEET 4.

WITNESSES:
Fred White
René Bruine

INVENTOR:
John Royden Peirce,
By Attorneys,

J. R. PEIRCE.
BOOKKEEPING MACHINE.
APPLICATION FILED AUG. 9, 1907.
1,233,699.
Patented July 17, 1917.
18 SHEETS—SHEET 5.
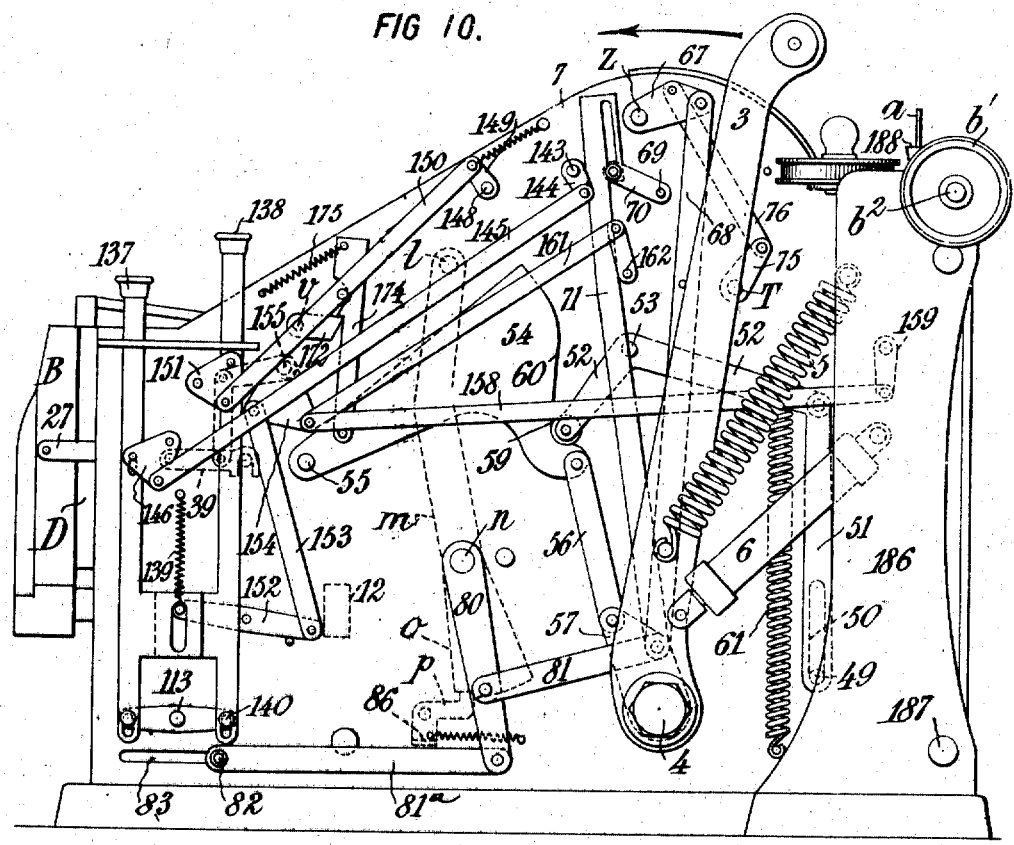
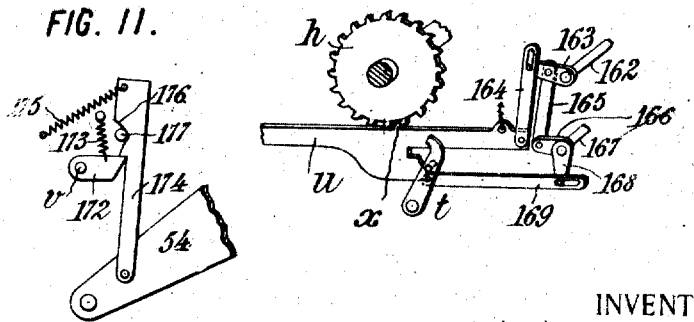
WITNESSES:
INVENTOR

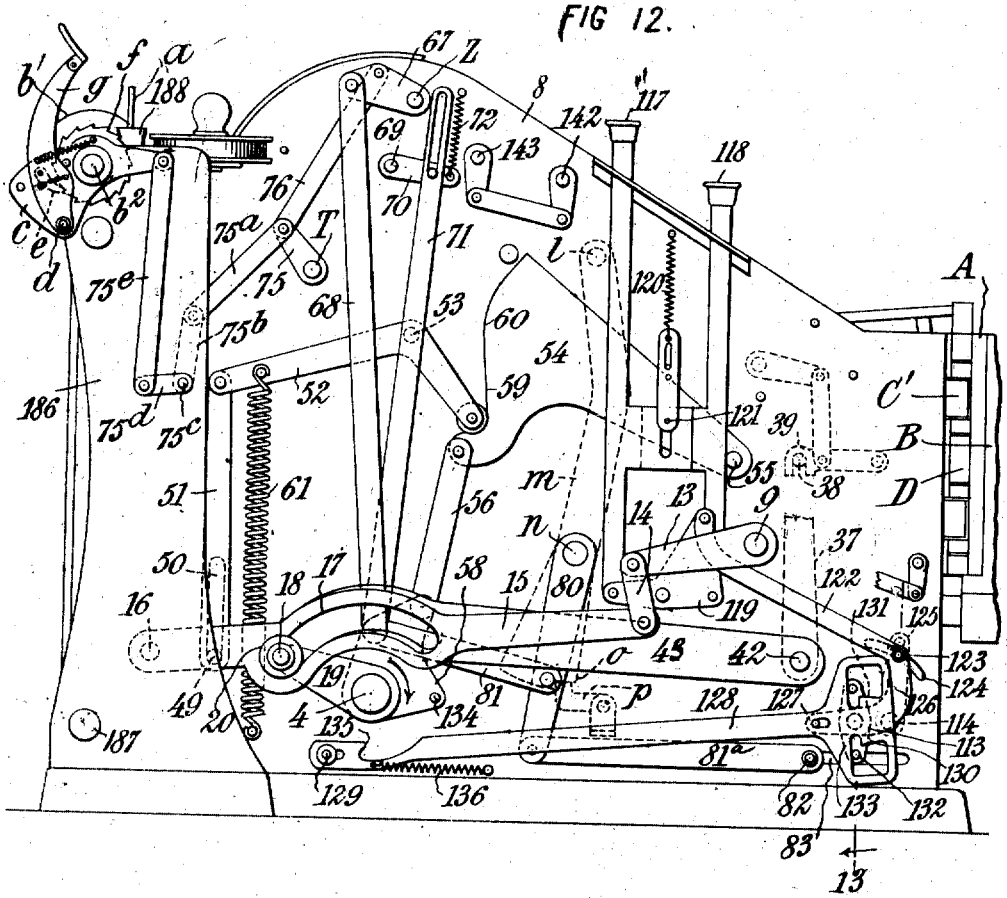
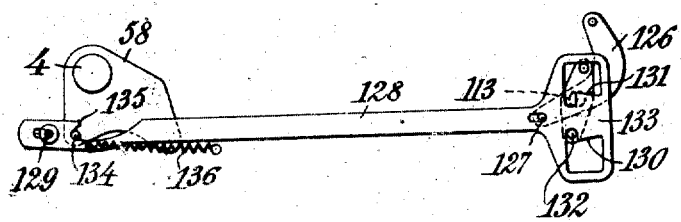
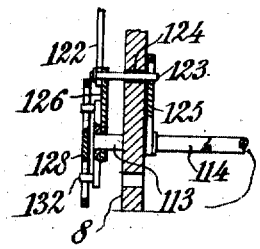

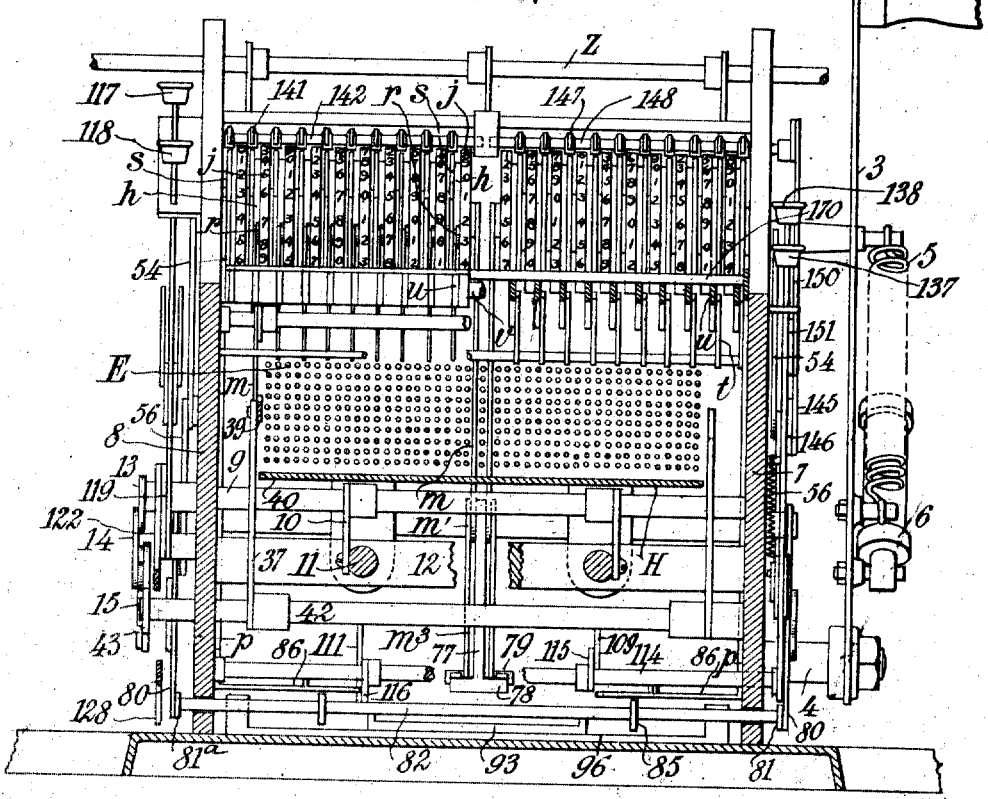

J. R. PEIRCE.
BOOKKEEPING MACHINE.
APPLICATION FILED AUG. 9, 1907.

1,233,699.

Patented July 17, 1917.
18 SHEETS—SHEET 8.

WITNESSES:
Fred White
René Bruine

INVENTOR:
John Royden Peirce,
By Attorneys
Arthur E. Chase and Dana

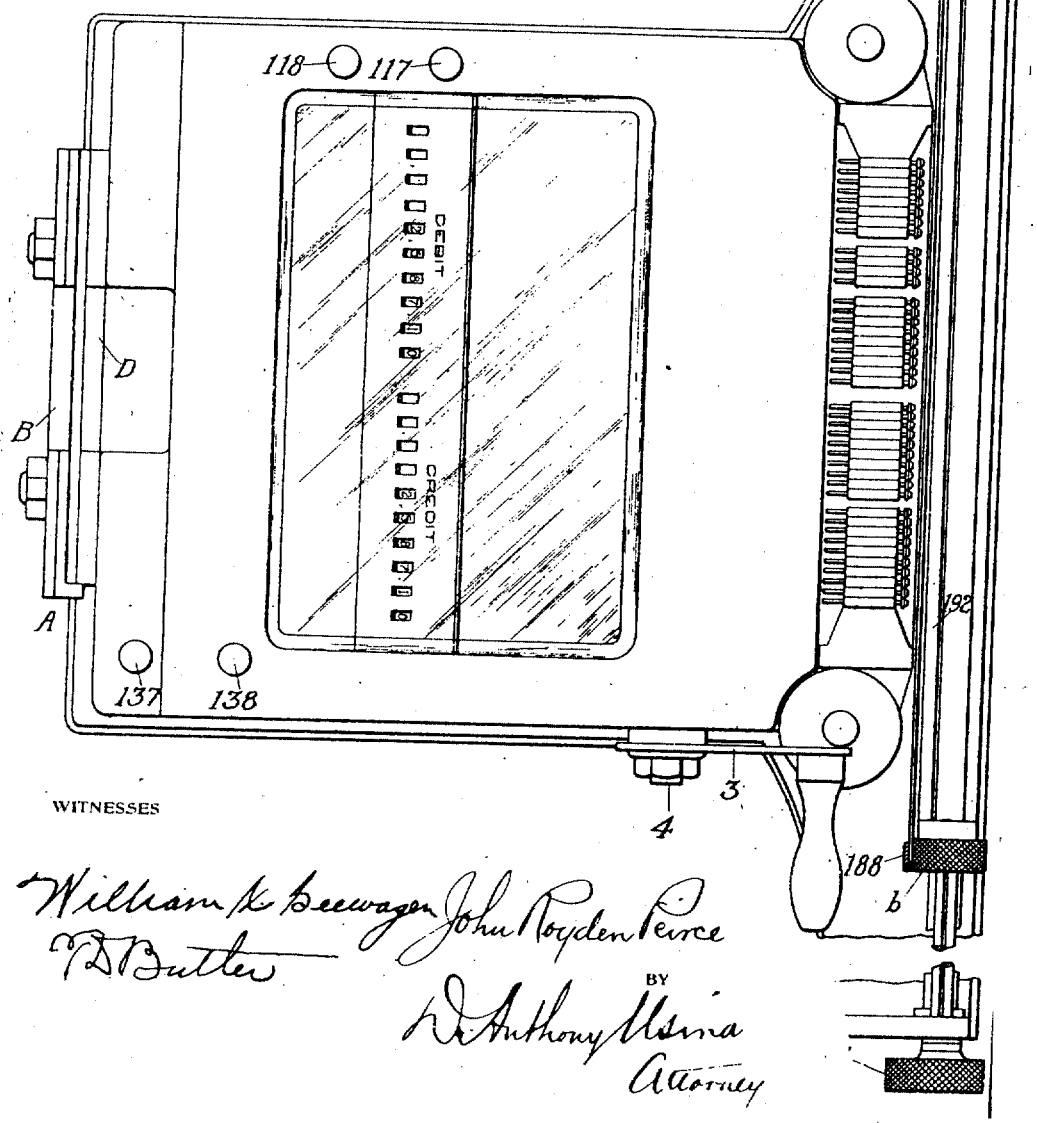

J. R. PEIRCE.
BOOKKEEPING MACHINE.
APPLICATION FILED AUG. 9, 1907.

1,233,699.

Patented July 17, 1917.
18 SHEETS—SHEET 10.

WITNESSES:
Fred White
René Meunier

INVENTOR:
John Royden Peirce,
By Attorneys

J. R. PEIRCE.
BOOKKEEPING MACHINE.
APPLICATION FILED AUG. 9, 1907.
1,233,699.
Patented July 17, 1917.
18 SHEETS—SHEET 11.
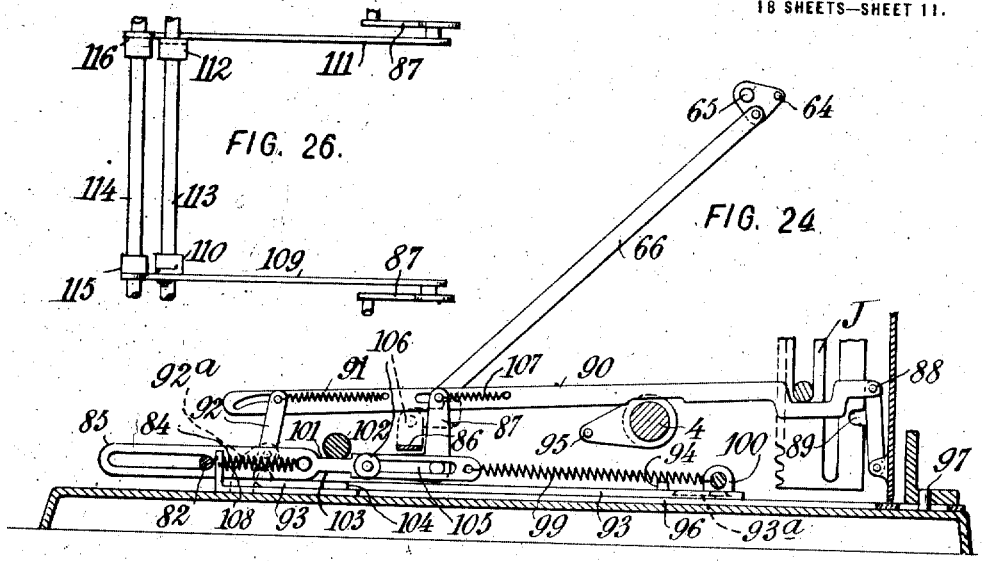
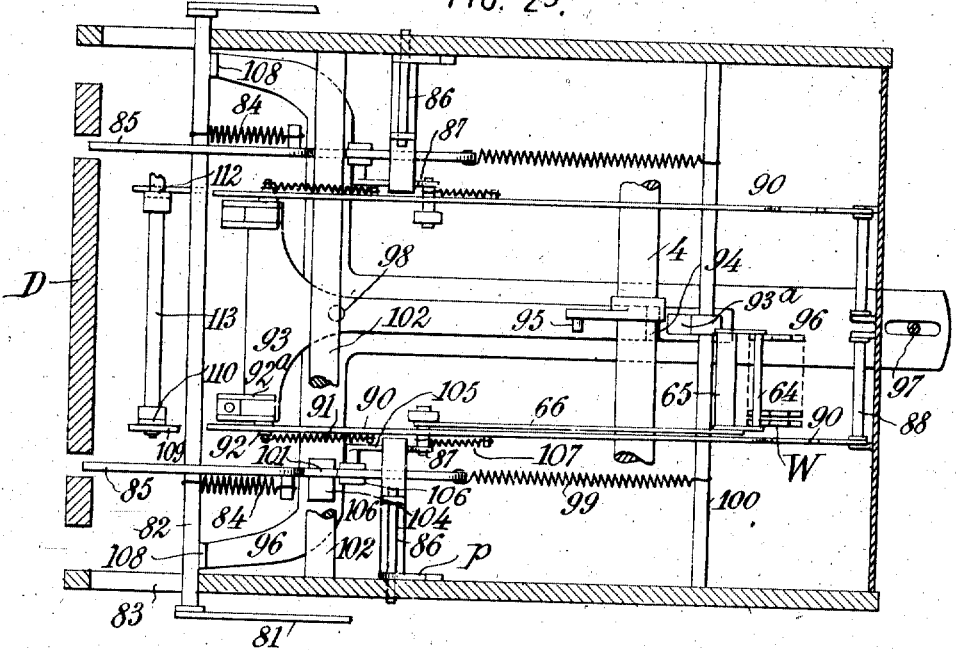

J. R. PEIRCE.
BOOKKEEPING MACHINE.
APPLICATION FILED AUG. 9, 1907.

1,233,699.

Patented July 17, 1917.
18 SHEETS—SHEET 12.

WITNESSES:
Fred White
Rene Meine

INVENTOR:
John Royden Peirce,
By Attorneys,
Arthur C. Robert Usina

J. R. PEIRCE.
BOOKKEEPING MACHINE.
APPLICATION FILED AUG. 9, 1907.

1,233,699.

Patented July 17, 1917.
18 SHEETS—SHEET 13.

WITNESSES:
Fred White
René Muire

INVENTOR:
John Royden Peirce,
By Attorneys,

J. R. PEIRCE.
BOOKKEEPING MACHINE.
APPLICATION FILED AUG. 9, 1907.
1,233,699.
Patented July 17, 1917.
18 SHEETS—SHEET 14.
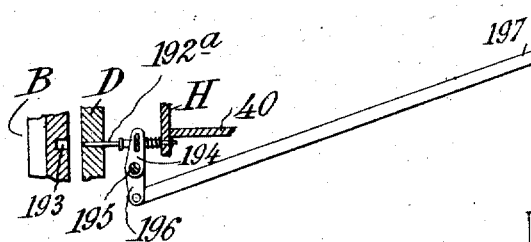
FIG. 39.
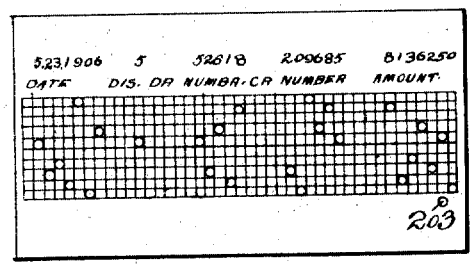
FIG. 37.
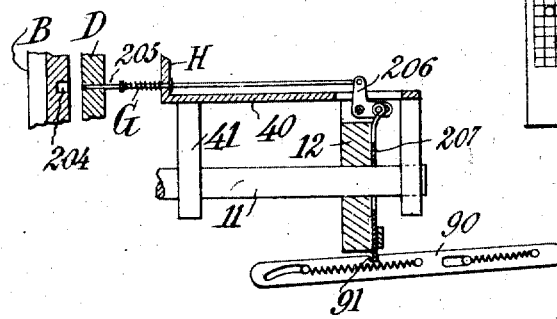
FIG. 36.
FIG. 38.
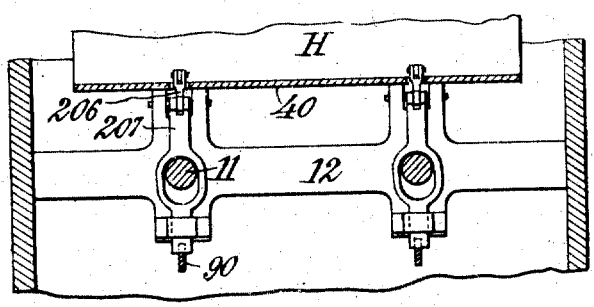
WITNESSES:
Fred White
René Muine
INVENTOR:
John Royden Peirce,
By Attorneys

J. R. PEIRCE.
BOOKKEEPING MACHINE.
APPLICATION FILED AUG. 9, 1907.

1,233,699.

Patented July 17, 1917.
18 SHEETS—SHEET 15.

FIG. 40.

| John Smith ACCOUNT. | | | |
|---|---|---|---|
| DATE | GOODS | DEBIT | CREDIT |
| 7-7-07 | 12 Yards Black Silk. | 20.25 | |
| 9-7-07 | 1 Yard Ribbon. | 1.75 | |
| 9-7-07 | By check | | 100.00 |

FIG. 41.

| No OF SHARES BOUGHT | No OF SHARES SOLD | NAME | STOCKS | RATE | AMOUNT BOUGHT | AMOUNT SOLD |
|---|---|---|---|---|---|---|
| | 100 | John Doe | USS & M | 120 | | 12.000 |
| 200 | | Richd. Roe | UP | 150 | 30.000 | |
| 150 | | John Smith | A.B & Y. | 80 | 12.000 | |
| 20 | | John Smith | N.Y.C. | 200 | 4.000 | |
| | 75 | John Doe | P & R. | 100 | | 7.500 |

WITNESSES:
Fred White
[signature]

INVENTOR:
John Royden Peirce.
By Attorneys,
[signature]

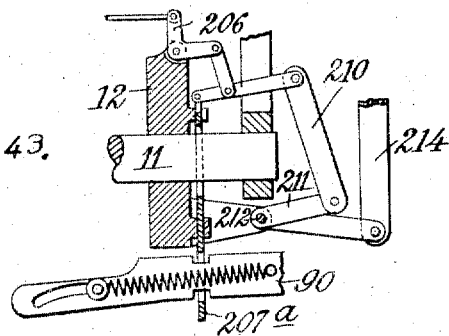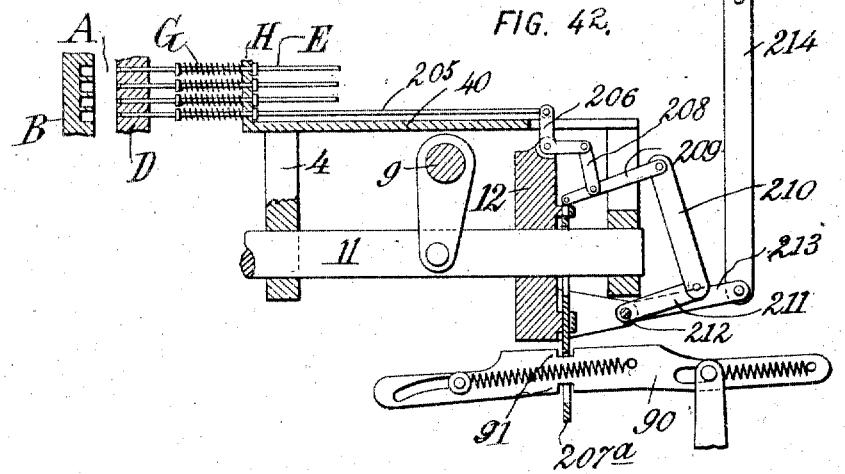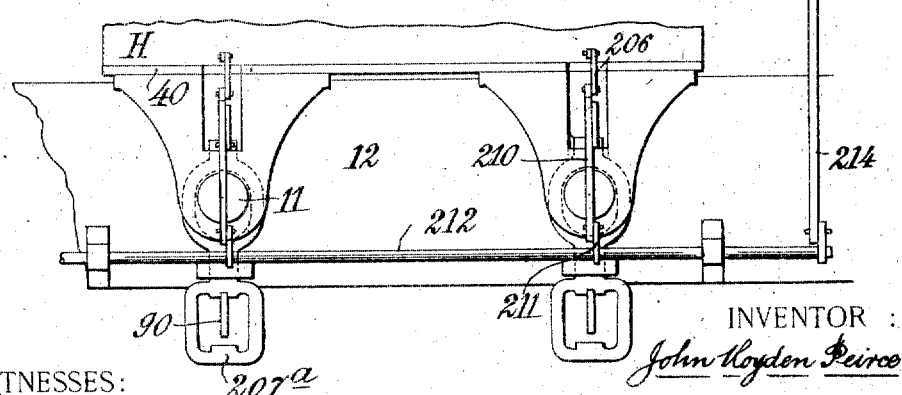

J. R. PEIRCE.
BOOKKEEPING MACHINE.
APPLICATION FILED AUG. 9, 1907.

1,233,699.

Patented July 17, 1917.
18 SHEETS—SHEET 17.

WITNESSES:
Fred White
Rene Ruine

INVENTOR
John Hayden Peirce,
By Attorneys
Arthur C. Hazard Uena

UNITED STATES PATENT OFFICE.

JOHN ROYDEN PEIRCE, OF NEW YORK, N. Y.

BOOKKEEPING-MACHINE.

1,233,699.  Specification of Letters Patent.  Patented July 17, 1917.

Application filed August 9, 1907. Serial No. 387,868.

*To all whom it may concern:*

Be it known that I, JOHN ROYDEN PEIRCE, a citizen of the United States, residing in the borough of Manhattan, city, county, and State of New York, have invented certain new and useful Improvements in Bookkeeping-Machines, of which the following is a specification.

In previous applications for patent, No. 321,050, of June 9, 1906, and No. 331,757, of August 23, 1906, I have described a system of mechanical bookkeeping in which perforated cards were used to indicate the several items of a bookkeeping entry and were adapted to control an apparatus for printing such items properly upon a sheet of a loose leaf book or the like; and I have described also an apparatus for perforating said card according to a determined system, and also mechanism controlled by the perforated card for reproducing the items on a sheet.

The present application is in part a continuation of the previous applications, and covers, with some modifications in detail the apparatus controlled by the card for reproducing the items on a sheet. The complete apparatus includes a number of separately valuable features. I will first describe in a general way the principal parts and functions of one style of machine embodying the invention and then explain the details with reference to the drawings.

A pocket of special construction is provided for the card, one of the walls being movable away from the other to permit the ready insertion of the card, and the pocket being open at the top and one side and provided with closures for holding the card in at the top and side.

The perforated cards control the positions of type controlling rods or pins which are yieldingly pressed against the card and which pass through the perforations thereof. These control rods are supported in sockets at their rear ends and the head of each serves as a stop to limit the movement of a type carrier so that the type is set in proper position to print.

Each type carrier is provided with a "no mark" or "blank" stop which prevents the operation of any one of its types in case there is no perforation in the column of the card corresponding to the type carrier. Each type carrier ordinarily carries ten types for the respective figures 0, 1, 2, 3, 4, 5, 6, 7, 8 and 9. Or where it is desired to print the letters of the alphabet the proper type carrier may be provided with a complete alphabet and its movement may be controlled by a modified system of perforations on the card. The type carriers are operated by means of springs which lift them to positions determined by the control rods when a holding-down rod is raised by the operation of the main handle. The lifting of the holding-down rod is effected through a cam provided with a dwell which is inoperative during the locking of the pocket and the actuating of the control rods, after which dwell there is a portion which releases the type carriers and then a second dwell for the operation of the hammer and other devices hereinafter described.

After the type are set in position they they are struck by hammers which are tripped by the operation of the main lever. These hammers are in a fixed horizontal line and strike the types which are brought in register with this line and thus print with one operation the full line upon the sheet.

The operation of the main lever or handle feeds the sheet upward. A hand release is provided for permitting the shifting of the sheet backward, that is downward.

Ordinarily a card will be used having five spaces punched to indicate respectively the date, distribution, debtor, creditor and amount. In printing by means of such a card it will be desired to insert the amount in the debit or left hand column of the sheet for one of the two parties concerned, and in the credit or right hand column of the sheet for the other party (it being understood that this card serves as a voucher and is first used by the creditor to make an entry in his own books, and is then forwarded to the debtor who uses it to make an entry in his books). Mechanism is provided in the present machine whereby the paper may be shifted to the right or to the left to print in the debit or credit column as desired, this mechanism being operated by suitable push buttons. In one embodiment of the invention illustrated a mechanism is provided, whereby upon finding in the creditor's or debtor's column of the card a set of perforations corresponding to the name of the owner of the machine in question, the machine will automatically shift the sheet so that the amount will be printed in the proper column. Such control of the debit and credit shifting mechanism is readily effected by means of the type carriers of the debit or credit group which, when they stand in position to set the type corresponding to the owner's name, release a device controlling the shifting mechanism (see Figures 25 and 26).

An alternative system is illustrated in Figs. 35 to 38, including cards provided with special perforations for automatically determining whether an item shall be printed at one side or at the other; and reversing mechanism whereby, upon pressing a button, the machine may be made to print at one side or the other even though using the same card.

Preferably the sheet is not shifted to the right or to the left, but, in order to print in either the debit or the credit column of the sheet, two groups of type carriers are arranged, one alongside the other, both of which are under control of the card, and either one of which may be rendered operative alone according to the intention to print in the debit or the credit column. The same principle may be extended to provide three or more sets of type for printing in any one (or more) of a corresponding number of columns; such mechanism being useful in arranging different classes of items in different columns.

In connection with the printing mechanism there is preferably provided an adding mechanism whereby after entering a number of items upon a sheet the operator may print the total mechanically. The adding mechanism also indicates through windows or the like in the frame of the machine, the separate items or totals as desired.

Various other features of advantage are referred to in detail hereinafter.

The accompanying drawings illustrate apparatus embodying the invention.

Fig. 1 is a front elevation of the complete machine;

Fig. 2 is a rear elevation thereof;

Fig. 3 is in part a plan and in part a horizontal section of the lower part of the machine;

Fig. 9 is a detail of Fig. 6 in perspective;

Fig. 10 is an elevation of the right hand side of the machine;

Fig. 11 is a detached detail of Fig. 10;

Fig. 12 is an elevation of the left hand side of the machine;

Fig. 13 is a sectional view approximately on the line 13 of Fig. 12;

Fig. 14 is a detail of Fig. 12 with the parts in a different position;

Fig. 16 is a vertical section from side to side of the machine;

Fig. 17 is a face view of the usual type of sheet printed on by the machine;

Fig. 22 is a top plan of the machine, showing the arrangement of the keys.

Figure 23:
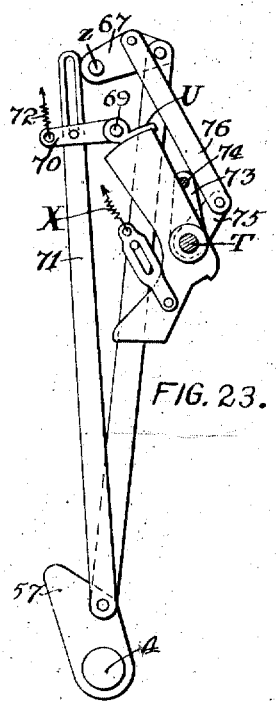
Figure 29:
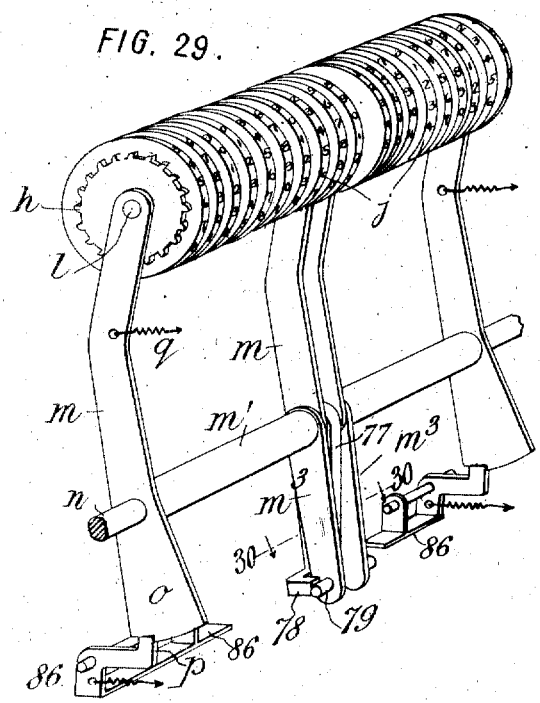
Figure 30:
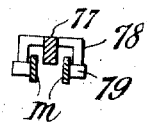
Figure 27:
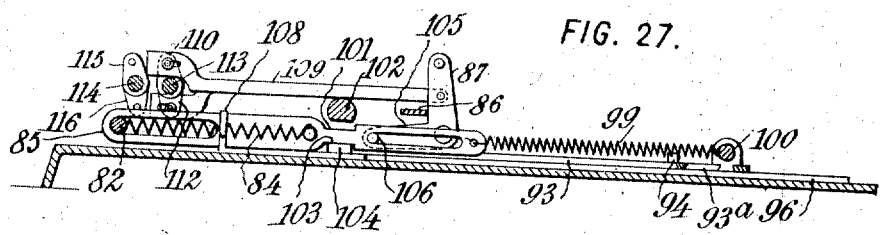
Figure 28:
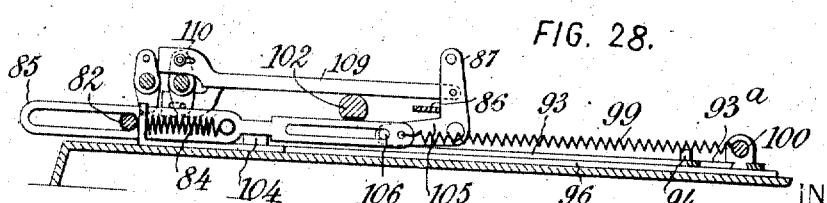

Fig. 23 the mechanism for controlling the hammers;

Figs. 24 and 25 the mechanism, in side elevation and plan respectively, for shifting the sheet;

Figs. 26, 27 and 28 are views similar to Figs. 24 and 25, with the parts in different positions;

Fig. 29 is a perspective view of the adding wheel carriers;

Fig. 30 is a section of Fig. 29 on the line 30—30.

Figure 31:
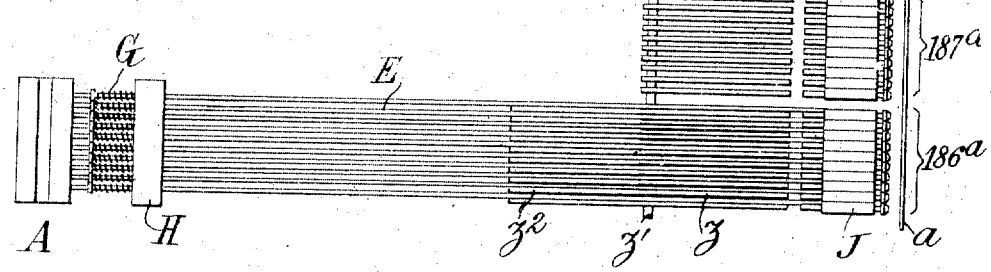
Figure 32:
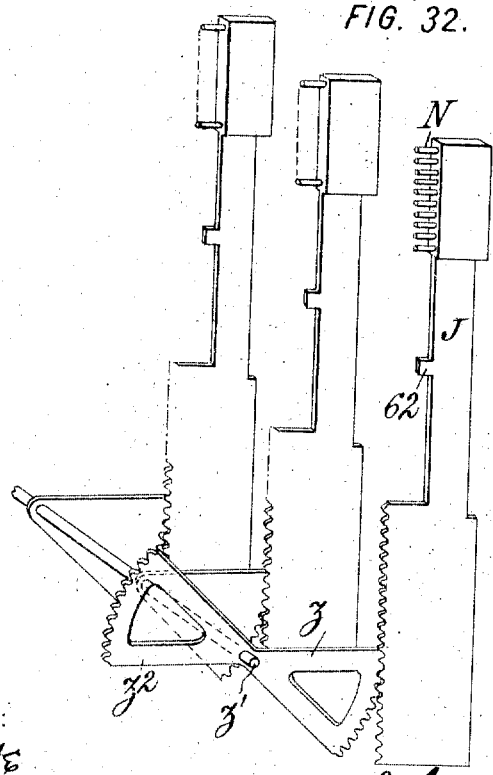
Figure 33:
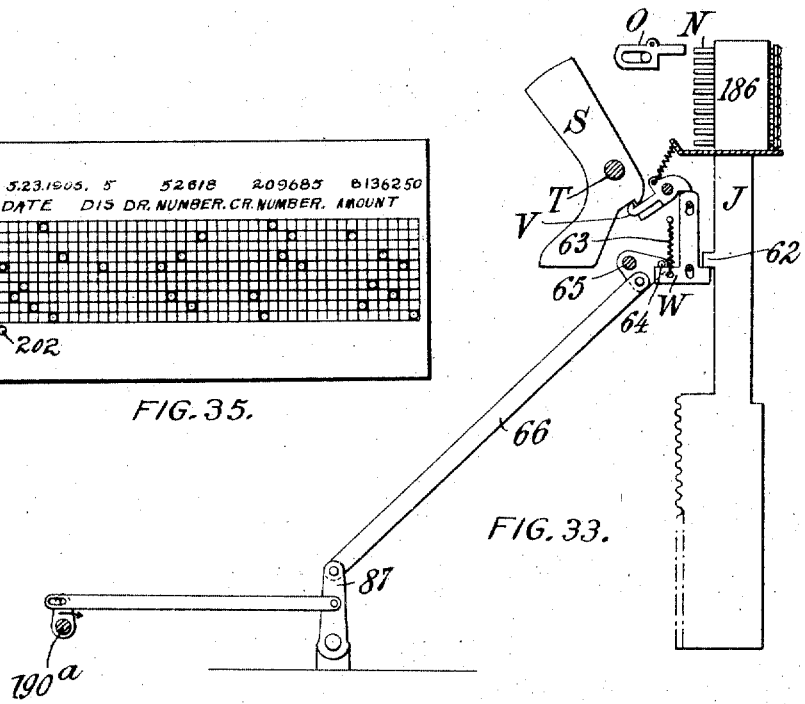
Figure 34:
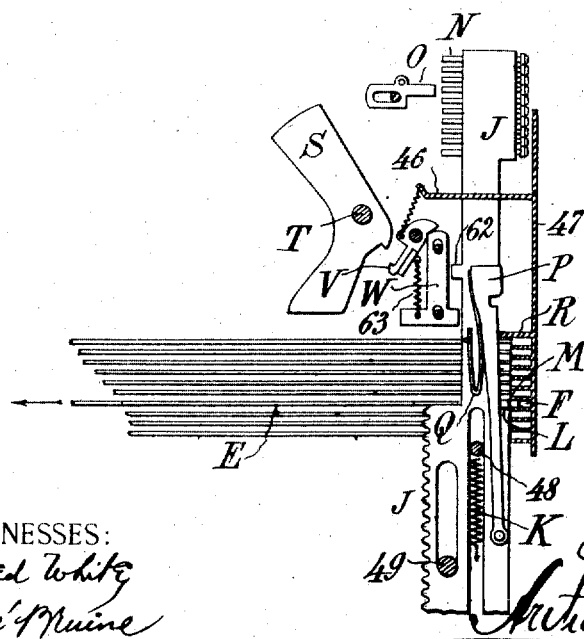
Figure 45:
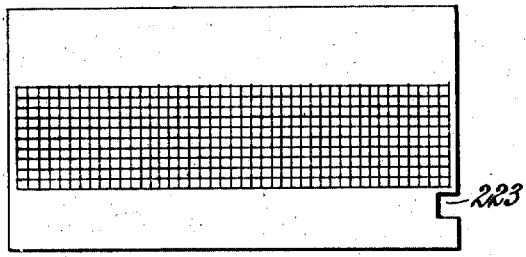
Figure 46:
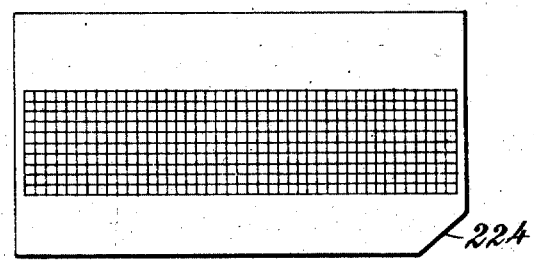
Figure 47:
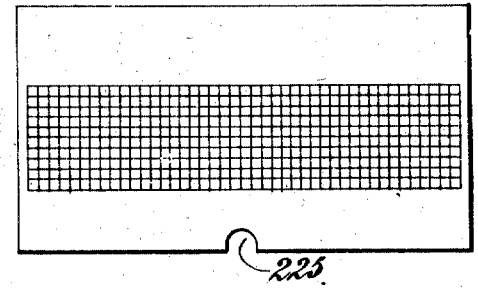
Figure 48:
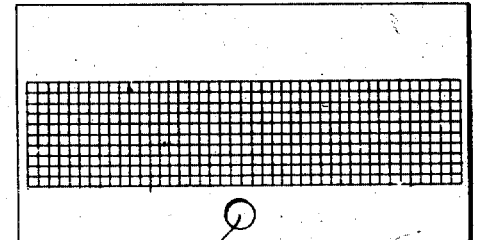

Figs. 31, 32 and 33 are a plan and details of the preferred arrangement for printing in the debit or credit column or in any one or more of a plurality of columns at will;

Fig. 34 is a detached view of a type carrier elevated in position to print a desired figure.

Figure 49:
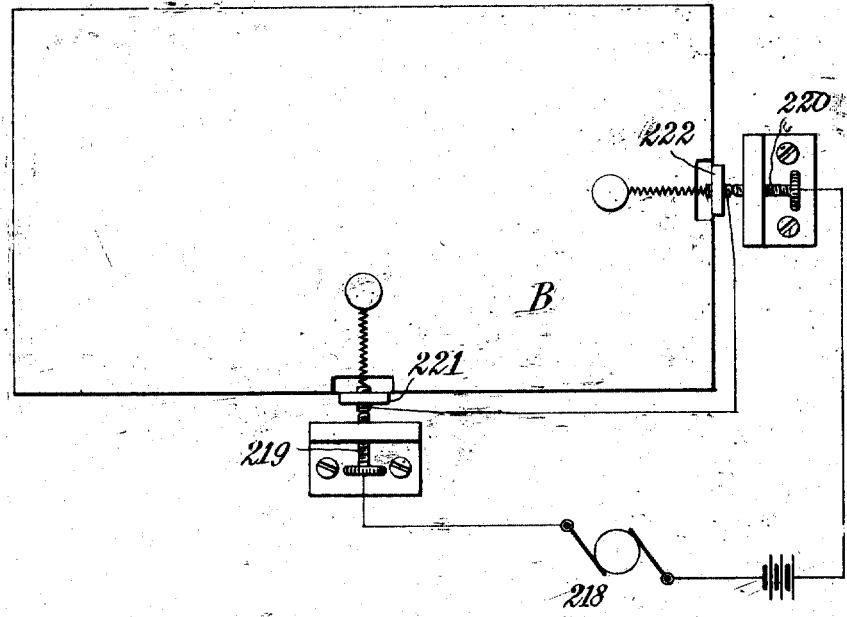
Figure 50:
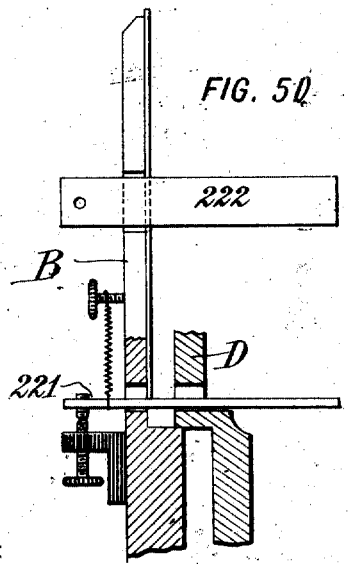
Figure 8:
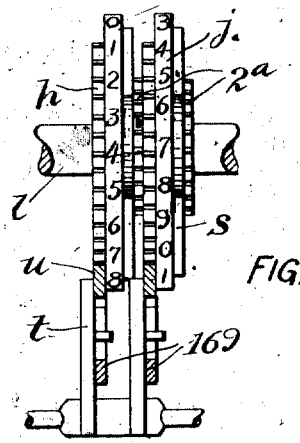
Fig. 8 is a rear elevation of trips for the adding wheels.
Figure 18:
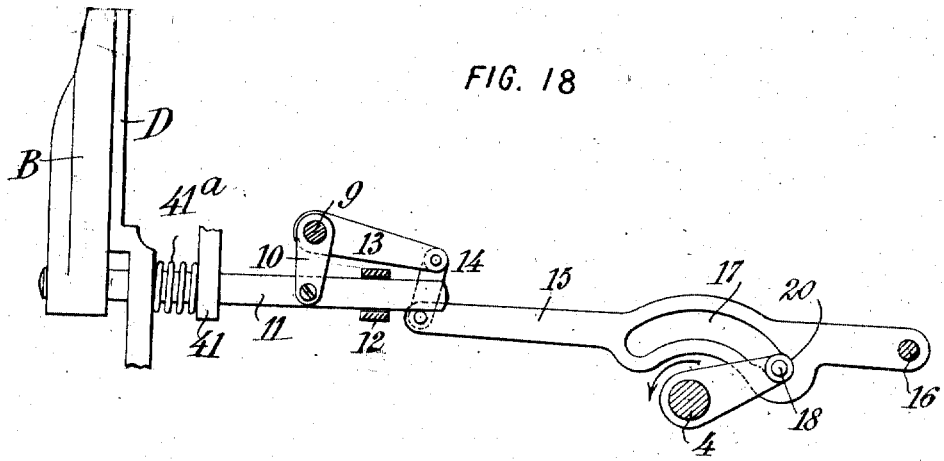
Fig. 18 is a side elevation of the mechanism for controlling the movable wall of the pocket.
Figure 35:
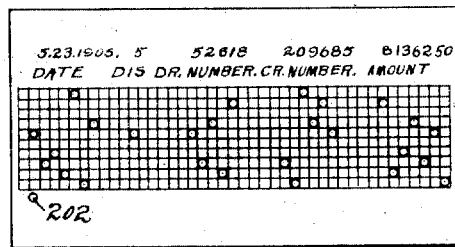
Figure 51:
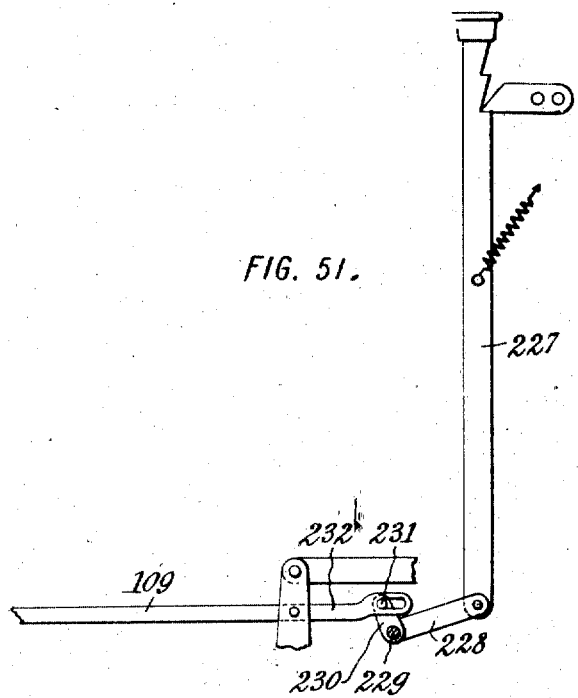
Figure 52:
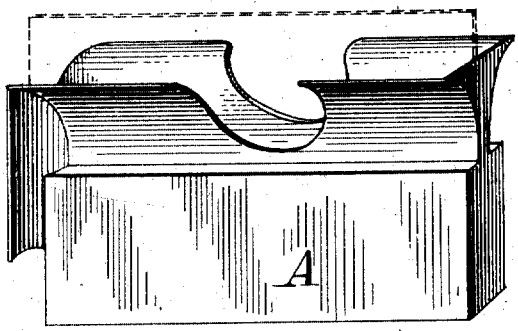

Figs. 35 and 36 are cards which cause the machine to print at one side and at the other respectively;

Figs. 37 and 38 are side and rear elevations respectively of a simple means of determining whether the machine shall print on the debit or on the credit side;

Fig. 39 is a separate view of the mechanism for preventing the operation of the type carriers when there is no card in the machine;

Figs. 40 and 41 are face views of different styles of printed sheets for which the machine may be adapted;

Figs. 42 and 43 are side elevations of a reversing mechanism, and Fig. 44 is a rear elevation of the same;

Figs. 45, 46, 47 and 48 are face views of different styles of card;

Figs. 49 and 50 are diagrammatic face and side views of locking mechanism;

Fig. 51 is a diagrammatic elevation of a listing key;

Fig. 52 is a perspective view of a card pocket with immovable wall.

Figure 5:
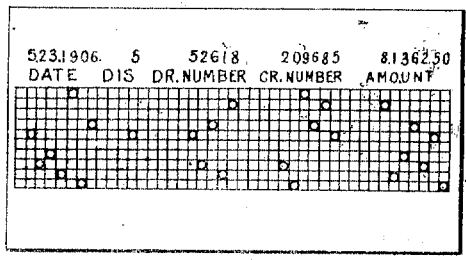
Fig. 5 is a face view of a controlling card.

The style of card by which the machine is to be controlled may be considerably varied, as hereinafter explained. As one example there is shown in Fig. 5 a card having five sections thereon indicating respectively the date, distribution, debtor's number, creditor's number and amount for a single item. The perforations are arranged in vertical columns, each column having ten spaces corresponding to the digits 0, 1, 2, 3, 4, 5, 6, 7, 8 and 9 respectively; so that the perforations in the card shown correspond to the numbers printed above the several sections thereof. The lines for dividing the card into proper spaces are shown only as indications of the numbers represented. They have no mechanical effect upon the machine, and are not necessary on the card.

The printed sheet may be a single item as in Fig. 17 or a simple statement of account such as is indicated in Fig. 40, or may be a more complicated statement such as is shown in Fig. 41. The important distinction in the two cases is that the sheet in Fig. 40 shows only one item (the amount), which is printed first in one column and then in the other (debit and credit); while Fig. 41, which represents a style of statement used in stock brokers' offices, contains two items ("Number of shares" and "Amount") in which the machine must print alternately at the left and at the right. The particular mechanism for making these variations is described hereinafter, and the machine may be varied so as to introduce this feature of selective or shifting action at various points of the sheet to be printed.

Figure 4:
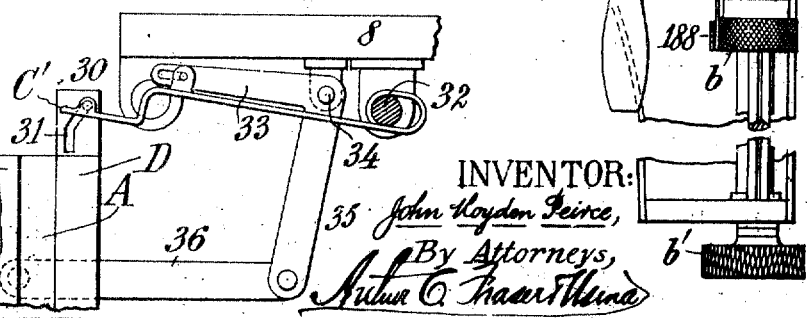
Fig. 4 is a detail of Fig. 3, enlarged.
Figure 6:
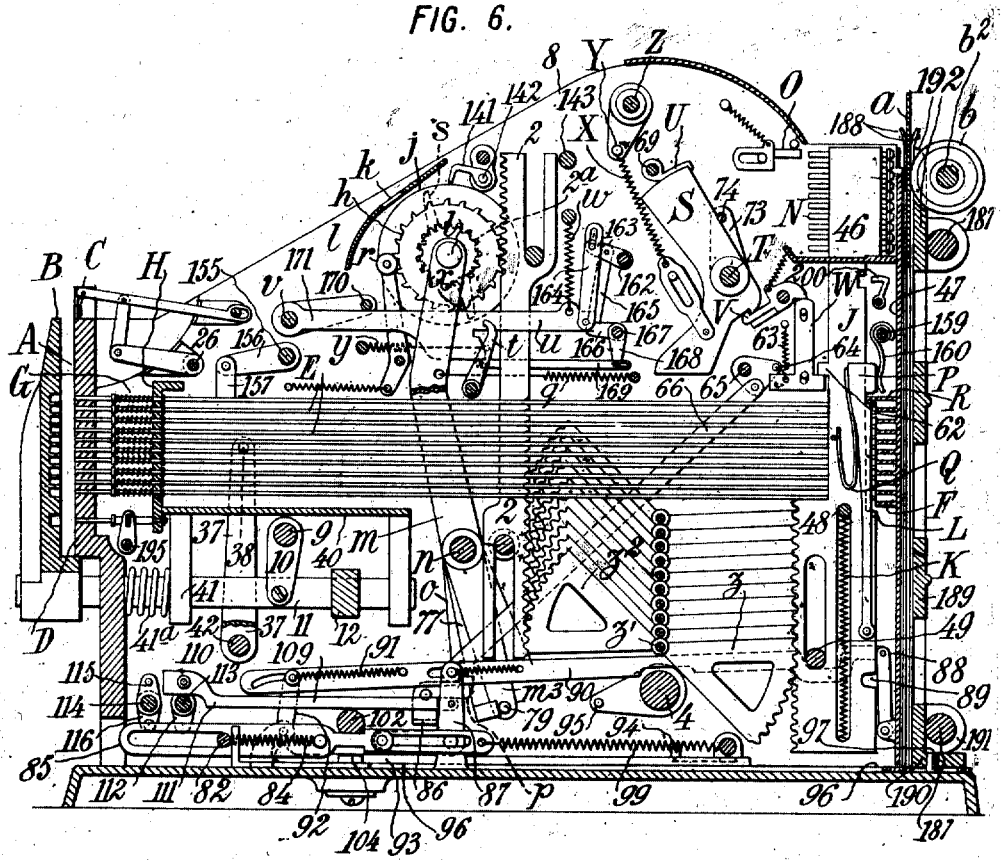
Figure 15:
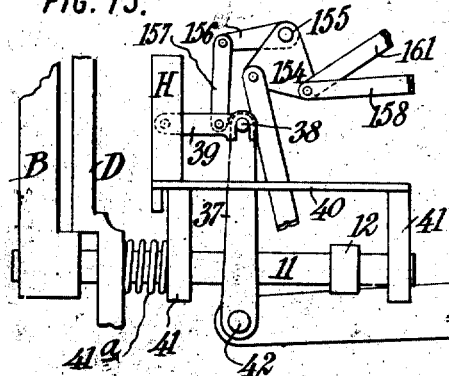
Fig. 15 is a side elevation of the mechanism for bringing the control rods against the cards.
Figure 7:
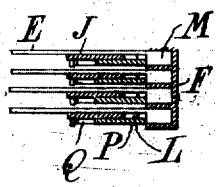
Fig. 7 is a horizontal section through the type carriers of Fig. 6.
Figure 19:
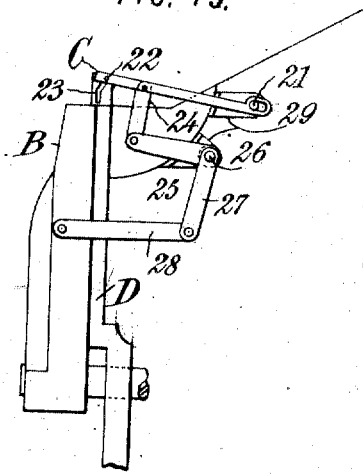
Fig. 19 is a side elevation of the mechanism for closing the upper edge of the pocket.
Figure 20:
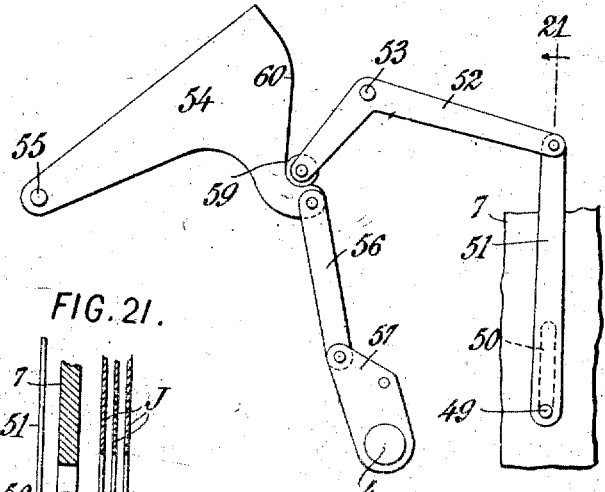
Fig. 20 is a side elevation of the mechanism for releasing the type carriers.
Figure 21:
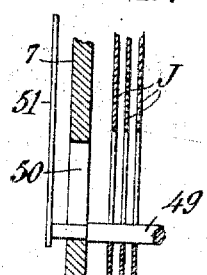
Fig. 21 is a section on the line 21 of Fig. 20.

Referring to the embodiments of the invention illustrated (and first to the preferred embodiment, Figs. 1 to 30), the pocket for receiving the card is designated as a whole by the letter A. The pocket is open at the top and at the left hand side edge as indicated in Fig. 3, and is provided with a movable wall B and with two top closures C, the operation of which is shown in Fig. 19 and two side closures C', the operation of which is shown in Fig. 4. The inner wall D of the pocket is provided with a number of perforations and the outer wall with a number of sockets, the perforations and sockets registering with the spaces upon the card. The closures are operated by the handle of the machine, as described hereinafter in connection with the movements of the handle and related devices.

When the card has been pressed into its position by the closures C, C' and the outer wall B has been moved inward to hold it, then a number of control rods E, the front ends of which project through the wall D of the pocket, and the rear ends of which are held in sockets F in the rear frame of the machine, are subjected to the pressure of springs G which are compressed by a plate H and tend to force the control rods through the card. Wherever the card is perforated a control rod will pass through it, otherwise not. The position of that control rod which is moved in each column of rods determines which type shall be set in position for printing.

For this purpose the series of vertical type carriers J (see especially Figs. 6 and 7) are arranged to be lifted by means of long spiral springs K and to be stopped by the engagement of a shoulder L with the head M (as in Fig. 7) of that rod E which passes through a perforation in the card and which correspondingly withdraws its head M partially out of its socket F.

Each of the type carriers J has at its upper end a set of types N normally retracted, but adapted to be driven forward against the paper (or intermediate ribbon) by means of a follower O, the follower being stationary and in line with the line of printing upon the paper so that it strikes the type which lies in the line to be printed.

It will be observed on the card, Fig. 5, that there are certain columns without perforations. Upon the printed sheet there will be no figure corresponding to such a column. For this purpose a "blank" stop is provided for each of the type carriers J and prevents the type carrier from having any movement whatever when no one of the control rods E of the corresponding column is passed through the card. This blank stop consists of a member P pivoted at its lower end to its type carrier J and pressed to the rear by a leaf spring Q also on the type carrier. The stop P is provided with a notch engaging a projection R upon the rear frame of the machine and until the stop P is moved backward sufficiently to disengage the notch from the projection R, the type carrier J cannot rise. The stop P, however, is pushed backward in the event of any one of the control rods E of the corresponding column passing through a perforation in the card and drawing its head M out of its socket. The rear edge of the stop is pressed normally against the heads M of the control rods so that when any one of them is moved forwardly the stop P is also moved forwardly to permit the type carrier to rise. Until a type-carrier rises, the corresponding hammer is held inoperative, as hereinafter explained, and consequently no mark is printed on the sheet.

For driving the followers O against the type a series of hammers S are employed mounted loosely on a shaft T and normally held retracted by means of a single pawl U covering the entire series of hammers; and also by individual pawls V applied to the hammers and withdrawn by the rising of the slide W whenever the latter is permitted to rise by the upward movement of the corresponding type carrier J, the latter overhanging a portion of the slide W as shown, so that the operation of a hammer is prevented as long as its type-carrier is held down by the blank stop P; and the spring which lifts the slide W being stronger than that which holds the pawl V in engagement. The springs X for operating the hammers S are drawn taut just before the operation of each hammer by the upward swing of the rod Y which is carried in the ends of arms keyed on the shaft Z for this purpose; and the springs being slackened by the return of the arms Y when the hammers are to be reset.

The paper or sheet a upon which the printing is done, and which may for example be a sheet of a loose leaf account book or the like, is fed upward, its side edges being held in vertical grooves in uprights 188, shown in elevation Fig. 2 and in plan and section respectively at opposite sides of Fig. 3, and the line upon which the printing is done being backed by a roller b which may be turned by means of a knurled handle b' at the right hand end of a grooved shaft b² upon which the rollers b are splined, as shown in Figs. 1, 2 and 10. The automatic feed is effected as shown best in Fig. 12, by means of a swinging arm c pivoted upon the grooved shaft b² carrying a pawl e engaging a ratchet wheel f on the shaft. The pawl e has a pin-and-slot connection with a thumb lever g pivoted upon the arm c at the point d whereby the pawl may be pressed back to permit adjustment of the roll and sheet by hand. The pawl e has a pin entering the small transverse slot in the lever g (see Fig. 12) so that when the lever is pulled forward by its spring the pawl is free to engage the ratchet; but when the lever is pressed backward by the operator the pawl is also pressed back out of engagement with the ratchet wheel.

Figure 6:
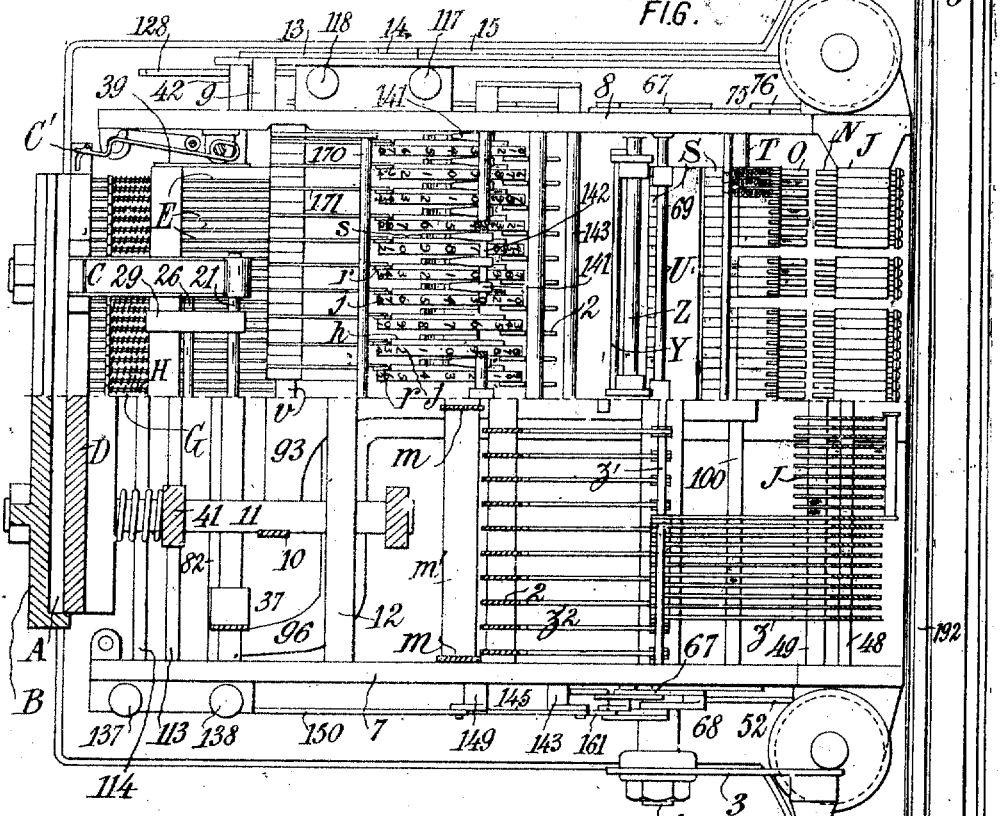
Fig. 6 is a vertical section from front to rear.

For indicating at the front of the machine the amounts which are being printed or the totals of the amounts, adding wheels are employed which are operated by the movements of the type carriers. As shown in Figs. 3, 6 and 16, there are two groups of adding wheels, a debit group and a credit group, and these are manipulated separately so that when a debit item is printed the amount is registered on the debit group of wheels, and vice versa. Fig. 3 shows only one of the two groups, the plane of section of one-half of the figure being below the other. Each adding wheel h carries a disk j, the periphery of which carries the figures, one of which is always presented before the window k so that the operator may observe it. Each of these disks in the present case is of sufficient diameter to carry two complete series of figures from 0 to 9. A separate shaft l for each group of adding wheels is mounted in a pair of bent arms m (Fig. 29) fixed on a sleeve m' loosely pivoted upon a shaft n and having tails o projecting below said shaft and held by pawls p, the upper ends of the arms m being pulled in a rearward direction by springs q. A brake r is preferably spring pressed against the adding wheels for preventing accidental rotation. Each adding wheel is provided with a pair of extended arms s at opposite points of its periphery, one for each of the series of figures on the indicating disk j and serving, when a wheel has been rotated throughout a distance of one complete series, to shift the next wheel and disk one step (so as to pass, for example, from 9 to 10 or 19 to 20, etc). This operation is effected by one of the arms s striking the end of a pawl t (Figs. 6 and 8) and withdrawing a pin at the side of each pawl from a notch in an arm u pivoted on the shaft v and normally pulled upward at its opposite end by means of a spring w. The arm u which is controlled by the particular pawl t is in the plane of the adding wheel next higher than the one whose arm s operates the pawl t. When the arm u moves upward a projection x carried upon its upper edge lies between two teeth on the part h of its adding wheel and when the adding wheel is swung toward the front of the machine as hereinafter described, the projection x is brought into engagement with one of the teeth and causes the wheel to turn a distance of one tooth. The pawl t is normally held in the notch of the member u by means of a spring y.

The movement of the type carriers is transmitted to the adding wheels through sectors z mounted on shafts z'. Since it is only the amounts which are to be added, and not the figures representing dates, names, or the like, these sectors are arranged to engage only the type carriers which print the amounts and which are located at the right hand side of the machine. But the amounts will sometimes be debits and sometimes credits, and sometimes one set of adding wheels and sometimes the other set must be operated; therefore in order to register on either the debit or the credit group of adding wheels an amount printed by the same set of type carriers, each of the shafts $z'$ carries at the right hand side a sector $z^2$ engaging the slides 2 which operate the right hand group of adding wheels, and each shaft $z$ carries a similar sector $z^2$ at the left hand side engaging a second slide 2. Fig. 3 shows the two sets of slides 2, those on the left in plan and those on the right in section; the sectors $z^2$ for operating the slides on the left being below the other parts shown, and being omitted from the drawing for the sake of clearness. The slides 2 are suitably guided by rods extending across the machine, and are provided on their front edges at their upper ends with rack teeth adapted to register with the round teeth $2^a$ on the wheels $h$. All the slides 2 therefore (those on the right as well as those on the left) partake of the same movements as their respective type carriers, moving upward as the type carriers move downward and vice versa. Normally both groups of adding wheels are held forward as in Fig. 6 with their teeth $2^a$ out of engagement with the slides 2 by means of the pawls $p$ until the type carriers are lifted to their proper position. One or other of the pawls $p$ (at the right or at the left) is then withdrawn, and the corresponding group of adding wheels is released and allowed to swing backward into engagement with the racks on the corresponding group of slides 2, and as the type carriers are brought down to their starting position, the slides 2 are correspondingly lifted and the adding wheels of the group which has swung backward are turned to register the amount last printed.

The type shown at the left of Fig. 3, and in fact all the type except the group at the extreme right of this figure, represent items other than amounts to be debited and credited. For example the type shown in this figure may correspond to the card of Fig. 5, the first group of type serving to print the date, the second group the distribution of the items, &c. The other group of wheels, which is held in forward position, is unaffected by the upward movement of its slides 2, being out of engagement therewith. Thus the amount printed is registered on one or the other group of adding wheels, the desired group being first selected by the withdrawal of its pawl $p$. The selective mechanism is described in detail hereinafter.

The mechanism for operating the several parts of the machine described by the movement of the handle will be here explained so as to understand more clearly the mechanisms afterward referred to, most of which have special rather than general applicability.

The operating handle or lever 3 is mounted on a main shaft 4 running entirely across the machine, and operating in succession the various elements of the machine as the lever is pulled forward and then allowed to move back under the influence of its retracting spring 5, the action of the spring being effected by a dash-pot 6. The various shafts extending across the machine are operated generally by groups of levers and links on the outside of the sides 7 and 8 of the machine.

*Card pocket.*—The outer wall of the card pocket is pulled inward by means of a shaft 9 carrying a pair of arms 10 pivotally connected to rods 11 and supported in the front wall of the machine and in a cross-bar 12 connecting the two side walls. The shaft 9 projects through the left hand side wall 8 of the machine (Figs. 12 and 18) and is connected by means of an arm 13 and link 14 to an arm 15 which is pivoted at its rear end to the side wall by means of a pivot-pin 16. The lever 15 is provided with a slot 17 in which swings a pin 18 on the end of an arm 19 on the main shaft 4. At the beginning of the slot 17 there is a notch 20 in which the pin 18 originally stands. On the first movement of the shaft 4 the pin 18 lifts the arm 15 until the pin is clear of the notch 20, after which the pin travels around the arc-shaped slot 17 without further effect. The lifting of the arm 15 turns the shaft 9 to operate the outer wall of the card pocket.

The top and side edge closures C and C' of the pocket are operated simultaneously with the inward movement of the outer wall B. The connecting mechanisms are indicated best in Figs. 3 and 19. The top closures C consist of bars which are provided at their rear ends with slots through which runs a fixed pivot rod 21. The opposite ends of the bars are provided with pins 22 engaging in slots 23 in suitable upward projections on the front wall of the machine, so that as the bars C are pulled down the pins 22 cause them to have also a forward movement. The movement of the bars C is effected by means of links 24 connected to arms 25 on a cross-shaft 26 which is operated by means of an arm 27 at its right hand end, and a link 28 connected to the corresponding side of the wall B of the pocket. The shaft 26 and rod 21 are mounted in brackets 29 projecting from the inner wall D of the pocket.

The side closures C' (Fig. 4) are similar bars having pins 30 operating in slots 31 in lugs arranged at the side of the pocket, so as to guide the closures C' forward, having their rear ends slidably pivoted on an upright 32 supported from the side wall 8 of the machine, the bars C' being swung backward and forward by means of a pin and slot connection with arms 33 on a vertical shaft 34 supported also from the side wall 8, and having its lower end an arm 35 connected by a link 36 to the outer wall B of the pocket; so that as the wall moves inward the arms 33 and the closures C' are swung inward, the latter at the same time sliding slightly forward.

*Control-rods or pins.*—The plate H is moved forward by means of arms 37 (see especially Fig. 15) at the right and left of the group of control-rods, and which carry at their upper ends pins engaging hooks 39 pivoted to the sides of the plate H. The plate H is supported by means of a horizontal extension 40 having depending arms 41 sliding on the rods 11. Springs 41ª pressing against the forward set of arms 41 hold the plate H normally retracted. The arms 37 are mounted on a shaft 42 which projects through the left-hand side wall of the machine (Fig. 12) and carries at its outer end an arm 43 operated by the same pin 18 which operates the arm 15 of the pocket mechanism. This arm 43 has a curved slot 44 with a notch 45 in which the pin 18 travels an instant longer than it travels in the corresponding notch 20 of the pocket-operating arm. Immediately after the closure of the pocket, however, the pin 18 reaches the end of the notch 45 and lifts the arm 43 about its pivot point 42, throwing the plate H forward and causing the control rods to pass through the card wherever the latter is perforated.

*Type carriers.*—The type carriers J are guided at their upper ends by means of a horizontal plate 46 (Fig. 6) attached to the back 47 of the machine, and at their lower ends by a fixed rod 48 extending across the machine, lateral movement of the type carriers being prevented by the control rods E located between them. Before the operation of the machine all the type carriers are held down by means of a rod 49 passing through slots in the type carriers, extending through corresponding slots 50 (Fig. 21) in both side walls of the machine, and connected at its outer ends to identical links 51, (Fig. 20) which in turn are connected to the rear ends of bent levers 52 pivoted at 53 and provided at their opposite ends with rollers in engagement with cams 54 pivoted at 55; these cams being connected by links 56 with, on the right hand end of the shaft, an arm 57, (Fig. 20) and on the left hand end of the shaft, an arm 58 (Fig. 12). (The two arms 57 and 58 produce identical movements of the two links 56, but are differently shaped for purposes hereinafter referred to). The points of connection of the links 56 with the several arms 57 and 58 are approximately in line with the center of the shaft 4, so that the first movement of the shaft produces only a slight movement of the cam. The cam edge is also divided into three curves which meet at approximately the points 59 and 60, the first part of the curve being substantially a dwell; the second part serving to operate the bent lever 52, and the third part being also a dwell. During the first dwell the pocket mechanism and the control rods are operated. The second part of the cams, by operating the bent levers 52, raises the rod 49 and allows the type carriers to move upward under tension of the springs K to the positions determined by the control rods. The third part of the cam holds the rod 49 up during the remaining forward movement of the handle, so as to permit the operation of the hammers and other devices. Springs 61 Figs. 10 and 12 hold the bent levers 52 up to their cams and pull the rod 49 down, as the cam permits, on the backward movement of the handle.

*Hammer control.*—When one of the control rods N (Figs. 6 and 7) is withdrawn the corresponding type carrier J is lifted to bring its shoulder L in contact with the head M of said control rod, the same head M having thrown the blank stop P to an inoperative position beyond the stop R so as to allow the type carrier to rise. The projection 62 of the type carrier having been lifted from the slide W, the latter has risen, under the influence of its spring 63, and has withdrawn the pawl V from the hammer S so as to permit the printing of the figure which is in line with the follower O. Whenever it is desired to be able to prevent the printing of a number opposite any group of type carriers, the slides W may be very conveniently utilized for such purpose. Means may be provided for holding down any one or any group of these slides, and thus preventing the printing of any number, notwithstanding the rising of the type carriers. For example, a rod 64 (Figs. 6, 25 and 26) may be arranged to overhang the desired group of slides W, and may be carried in arms on a shaft 65 which may be swung to raise the rod 64 and release the slides W, and to lower the rod 64 and to hold down the slides W to render the corresponding hammers inoperative. The rod 64 may be swung up and down by means of a link 66 connected to one of the arms referred to, and connected at its opposite end to any desired mechanism. Both an automatic and a manually controlled mechanism for operating the link 66 will be hereinafter described.

*Hammer operation.*—After the setting of the type carriers in their final positions, and the releasing of such hammers as it may be desired to operate, the next movement of the handle operates the hammer. For this purpose the shaft Z passes through both the right and left hand walls 7 and 8 of the machine, being provided on its opposite ends with arms 67 connected by links 68 to the arms 57 and 58 respectively on the opposite ends of the main shaft 4, these connections being also very nearly in line with the center of the shaft 4, so that the first movement of the shaft has little effect. During the entire movement of the handle the arm 67 is pulled down and the shaft Z turned in a direction to tauten the springs X which drive the hammers.

The shaft 69 of the pawl U also projects at both ends through the side walls 7 and 8, and is provided on its outer ends with arms 70 connected by a pin and slot with links 71 also pivoted at their opposite ends to the respective arms 57 and 58 on the opposite ends of the main shaft 4. A spring 72 (Fig. 12) may be provided at the left hand end for holding up the arm 70 and insuring a quick falling of the pawl. Thus the forward movement of the handle, after setting the type, tautens the hammer springs while the links 71 are moving through a distance corresponding to the lengths of the slots in their upper ends, and then turns the shaft 69 and lifts the wide pawl U so that the desired hammers strike the corresponding followers O and impress the type on the sheet.

After the hammers have been operated, special means are necessary for resetting them during the backward movement of the handle. The shaft T on which the hammers are loosely mounted is provided with arms 73 within the side walls of the machine, running between the ends of which is a rod 74 adapted to engage the rear edges of all the hammers and to swing them forward to their starting position. The shaft T projects through both the side walls 7 and 8 of the machine, and is provided at each end with an arm 75 connected by a link 76 with the arm 67 on the corresponding end of the spring-controlling shaft Z. When the shaft Z is turned in the direction to tauten the springs X so as to prepare the hammers for striking, the shaft T is simultaneously turned in the direction to withdraw the rod 74 from the hammers so as to leave the latter free to swing forward when their pawl is lifted. In the rearward movement of the handle the shaft Z is swung in the direction to loosen the springs X, and the shaft T is swung to bring the rod 74 against the edges of the hammers and press them all back until they click under the pawl U.

At the left of the machine (Fig. 12) a connection for operating the paper feed is shown running from the arm 75 by means of links $75^a$, arm $75^b$, shaft $75^c$, arm $75^d$ and link $75^e$ to an arm of the lever $c$.

*Adding wheel mechanism.*—Each of the two groups of adding wheels shown in Fig. 29 has its side arms $m$ connected to each other by a shaft $l$ and sleeve $m'$, and the loose central shaft $n$ has at a point between the two groups a depending arm 77 which at its lower end, as indicated in Fig. 30, is provided with bent arms 78 lying in the rear of pins 79 on the lower ends of the adjacent arms $m^3$ which are fast on the respective sleeves $m'$. The shaft $n$ projects through both side walls 7 and 8, and is provided on each of its ends with an arm 80, intermediate points of which arms are connected by links 81 with the respective arms 57 and 58 on the main shaft 4 in such a position that upon the very first forward movement of the handle the shaft $n$ is turned to swing the stops 78 out of the way of the lower ends of the wheel-carrying arms $m$ so as to leave the wheels free to be swung forward except for the individual pawls $p$. On the return movement of the handle the last operation is the pulling of the links 81 so as to swing the shaft $n$ in the opposite direction and reset the wheels,—that is, throw them forward out of engagement with their racks.

The arm $u$ (Figs. 6 and 9) carrying the projection $x$ for shifting from 9 to 10, etc., should stand normally in its lowered position locked down by the pawl $t$. At each forward operation of the handle all the arms $u$ are therefore reset to their lowered position by means of a rod 170 overlying said arms $u$ and carried on the ends of arms 171 which are fastened on the shaft $v$ (it being understood that the arms $u$ are loose on this shaft.) The shaft $v$ projects through the right hand wall 7 of the machine (Figs. 10 and 11), and is provided with an arm 172 normally pulled up by means of a spring 173 (Fig. 11) and adapted to be pulled down and then allowed to spring up by means of a hook 174, which hook is pivoted at its lower end to the cam 54, is pulled forward at its upper end by a spring 175, and is guided by an oblique edge 176 engaging a pin 177 fixed to the side wall of the machine. The movement of the handle of the machine, therefore, pulls down the hook 174 which is at the same time pushed backward by the pin 177 until the shaft $v$ has been turned far enough to depress all the arms $u$ and allow them to be engaged by their pawls $t$ and held out of operative position, after which the arm 172 clicks over the nose of the hook 174 so as to leave the arms $u$ free to rise when the rotation of the adding wheels is taking place.

In the simplest types of the machine, in which it is desired to record on the adding wheels every movement of the type carriers, the mechanism thus far described is sufficient. More frequently, however, it will be desired to operate one set of adding wheels at one time, and another set at another time, in what we may call a selective manner.

*Adding wheel selective mechanism.*—The two arms 80 on the outer ends of the shaft $n$ are connected at their ends by means of links $81^a$ with the projecting ends of a rod 82 extending entirely across the machine and adapted to be moved toward the front of the machine through slots 83 at the first forward movement of the handle; this rod 82 serving to stretch a pair of springs 84 (Figs. 24 and 25) which are attached to controllers 85 hereinafter referred to for causing the sheet to be shifted to the right or to the left to bring the debit or credit column in line with the "amount type." For releasing one or other of the groups of adding wheels, the pawls $p$ are provided with inward lateral extensions 86, which lie in the paths of approximately vertical arms 87 pivoted upon standards rising from the base of the machine and adapted when pulled forward to strike the extensions 86 and pull down the pawls $p$ to release their corresponding groups of adding wheels. The link 66 which controls the rod 64 for maintaining a certain group of hammers inoperative notwithstanding the rising of the corresponding type carriers, may be connected to the arm 87 so as to hold back the desired group of hammers notwithstanding the operation of the adding wheels as well as the rising of the type carriers. Or the link 66 may be separately controlled as desired. This suppression of a certain group of hammers is useful, for example where it is desired to print only one total instead of both totals in the manner hereinafter describ'ed.

The arms 87 may be controlled either automatically or manually, and either with or without the paper-shifting arrangement shown. Preferably both automatic and manual provisions are supplied. The automatic mechanism is shown without the manual connections in Figs. 25 and 26, and the manual connections alone are shown in Figs. 27 and 28 in connection with the sheet-shifting mechanism; and in Fig. 33 without such sheet-shifting mechanism.

Referring first to Figs. 24 and 25, the mechanism is controlled by a pair of rods 88 each of which is independently supported in pivoted arms at the rear of the line of type carriers J. One rod 88 extends along the group of type carriers which corresponds to the name of the creditor and the other rod 88 extends along the group of type carriers which corresponds with the name of the debtor. Each group of carriers is provided with notches 89 at such positions that when the type carriers are lifted to the several points necessary to print the name of the owner of the machine, the several notches 89 of one group or the other are in line with the rod 88, so that the rod may be pulled forward into the notches. This will, as hereinafter described, shift the sheet so as to reverse the debit and credit columns thereof. Connected to one end of the rod 88 is a link 90 which is connected by a spring 91 to a pin on the upper end of a lever 92 pivoted upon a support 92$^a$ attached to the base of the machine, the lever 92 being connected at its lower end to a slide 93, which, at its rear end, has an upright projection 94 adapted to be engaged by a pin 95 carried on an arm of the main shaft 4, when the latter is near the end of its turning movement and just before the hammer strikes. The pulling of the slide 93 to the rear swings the upper ends of the arms 92 forward and stretches the spring 91, so that if one or other set of type carriers is in proper position for the rod 88 to enter its notch 89 the corresponding link 90 may move forward. This link has a slot engaging a pin on the upper end of the arm 87 which controls the adding wheels in the manner previously described. For guiding the rear end of the slide 93, it is provided with a groove 93$^a$ into which fits a downward projection from the rod 100, shown in dotted lines in Figs. 4 and 14.

For shifting the sheet to the right or to the left, a T-shaped lever 96 is provided, the stem of which extends to the rear and under the carriage, where it is slotted and engages a pin 97 on the carriage, so that when the stem is swung to the right or to the left the carriage will be correspondingly shifted. The amount-printing types are immovable laterally, so that by shifting the sheet to the right they print in one column and, by shifting it to the left, in the other column. See, for example, the debit and credit columns in Fig. 40. The mechanism which shifts the sheet also causes the operation of one or the other set of adding wheels, so as to correctly total the amounts printed in the debit and credit columns respectively. The T-lever is pivoted at 98 to the base of the machine, and the slide 93 lies upon the T-lever. Each of the controllers 85 previously referred to is normally held at its rearmost point (see Fig. 27) by a comparatively weak spring 99 attached to a fixed rod 100 supported in standards on the base of the machine. It is provided with an upper notch 101 adapted, when engaged by the fixed rod or stop 102 extending between the side walls of the machine, to be held in its rearmost position; and a lower notch 103 adapted, when the controller is depressed to free the notch 101, to engage a projection 104 upon the upper face of an arm of the T-lever. Connected to the vertical arm 87 is a horizontal arm 105 having a pin 106 lying in a slot in the rear end of the controller 85, and adapted, when the arm 87 is moved forward, to depress and unlock the controller. When this occurs, and the rod 82 has been moved to the front (Fig. 27) and the stronger spring 84 has been put under tension, the controller, and with it the corresponding arm of the T-lever, will be pulled forward (Fig. 28) and the paper shifted accordingly. After the operation, when the handle of the machine is turned back, the retraction of the rod 82 causes it to engage an upright projection 108 on that arm of the T-lever which has been moved forward, and to return it rearwardly until it reaches its middle position, where the rod engages both projections 108 and cannot move further. The spring 84 being slackened the controller is pulled to the rear by its spring 99. The lever 87 is pressed backward, throwing the rod 88 out of the notches of the type-bars; and the spring 91 pulls the lever 92 and slide 93 back to starting position.

The hand control of the upright 87 and consequently of the adding wheels (which I refer to as debit and credit mechanism, though it may be used in various selective operations), and the sheet-shifting mechanism when desired, may be very simply arranged as in Figs. 26ª, 27 and 28. This hand control may be used either in place of or in combination with the automatic control of Figs. 24 and 25. It is understood that there are two separate upright levers 87 at the right and left of the machine respectively and engaging the separate extensions 86 of the pawls $p$. The right hand lever 87 is connected to a link 109 which is slotted upon a pin on the end of an upward arm 110, while the arm 87 at the left hand side of the machine is connected to a similar link 111 slotted on a pin on the end of a depending arm 112, the arms 110 and 112 being fixed on a shaft 113 which I term the debit and credit shaft. When this shaft is swung in one direction, say as in Fig. 27, it pulls the link 109 and operates the arm 87 and the adding wheels at the right hand side of the machine. When it is swung to the opposite direction it operates the adding wheels at the left hand side of the machine. Immediately in front of the shaft 113 is a locking shaft 114 which carries an upward arm 115 and a depending arm 116 registering with the arms 110 and 112 respectively, so that when the shaft 114 is tilted it holds one or the other of the links 109 and 111 from operating, and locks the corresponding group of adding wheels, while unlocking the other link, 111 or 109, and its adding wheels.

The shaft 113 projects through both the side walls of the machine. On the outer side of the left hand wall 8 it is connected with "single item debit and credit" buttons which are intended to control by hand the actuating of the debit group of adding wheels at will. The opposite end of the shaft projects through the right hand side wall 7 of the machine, and is operated by "total debit and credit" buttons, by which the operator can print at any time the total of the debit items or the total of the credit items.

The single item buttons 117 and 118 (Fig. 12) are connected at their lower ends to a centrally pivoted lever 119, so that they necessarily move in opposite directions and are normally held in their central position by means of a spring 120 exerting an upward strain on a pin 121 passing through slots in lateral extensions of both buttons. A link 122 is connected to the lever 119 so as to be shifted in one direction or the other by the pushing down of one button or the other, and is provided on its end with a pin 123 which passes through a curved slot 124 and enters a slot in the end of an arm 125 (Fig. 13) on the locking shaft 114. The link 122 is also connected to a lever 126 pivoted loosely on the shaft 113 and having its other arm connected by a pin 127 with the frame 128 which swings about a pivot 129 at its opposite end passing through a slot so as to permit the frame to slide as well as to swing. The right hand end of the frame is provided with a pair of shoulders 130, 131, and when this end of the frame is swung upward or downward by the movement of the pin 127 the frame assumes a position in which one of the shoulders 130 or 131 engages one of the pins 132 which are on the opposite ends of a double arm 133 on the shaft 113. Thus the pressing of the button serves to lock the shaft 113 against rotation in the wrong direction, and to set it for operation in the correct direction. The actual operation of turning the shaft 113 is effected by pulling the frame 128 to the rear, this action being the result of engagement of a pin 134 on the arm 58 with a shoulder 135 near the rear end of the frame. A spring 136 serves to restore the frame 128 to its original position when the handle is thrown back. In order to print an item in the debit column, therefore, the operator will press say the button 117, and will hold it pressed until he has completed the movement of the handle (as in Fig. 14). With the complete mechanism shown this will insure that the paper shall be shifted to the right so as to present the debit column to the amount type, and that the debit group of adding wheels will be operated to register a corresponding amount; also that the name of one of the parties shall not be printed, either because it has already been printed and is not to be repeated, or for some other reason.

*Printing totals.*—After a number of items have been printed on a sheet, the adding wheels will show an amount which is the total of all the amounts printed. Supposing the separate amounts to have been classified as debit and credit, or otherwise, and each class of items to have been registered only on its own group of adding wheels, then each group will show a corresponding total. The printing of the total calls for the setting of the type under control of the proper adding wheels, which, in setting the type, will be turned back to zero. The button corresponding to the desired group of adding wheels being pressed, the adding wheels are thrown back into engagement with their racks, and, upon the movement of the handle, the racks turn the wheels back to zero and at the same time lift the type carriers to points corresponding to the number of units which their several wheels have turned. The continued movement of the handle causes the hammers to strike their types and to print the total. If now, with the handle in its forward position and the amount printed, the button be released, the adding wheels will swing forward to their normal position of disengagement and will be set at zero, so that the making up of a new total may be commenced upon them; but if the operator wishes to continue the registering of subsequent numbers upon those already registered, he will hold the button down until the handle is pushed back to its starting point. This backward movement of the handle will return the type carriers to their normal positions and will operate the adding wheels in the usual way to register the number last printed, which was the total of all the previous numbers.

In the machine illustrated two buttons are provided for taking off respectively the total debit or the total credit, and these I call the total debit and credit buttons. They are at the right-hand end of the machine and illustrated best in Fig. 10. The two buttons are 137 and 138, and they are normally held in their middle positions by a spring 139. At their lower ends they are slotted over pins 140 on the opposite ends of a cross-arm carried on the debit and credit shaft 113, so that the buttons act directly to turn the shaft 113, which releases the corresponding group of adding wheels and allows them to swing forward. At the same time the pushing of the total button operates several other instrumentalities.

In order that when the wheels are in engagement with their racks, and are to be turned backward, they may be stopped at the zero position, a pair of stops is provided, one for each group of wheels. From the left hand wall 8 to the center of the machine (Figs. 3, 6 and 16) is a series of stops or pawls 141 for the left hand groups of wheels, arranged on a swinging shaft 142 which projects through the wall 8 (compare Figs. 6 and 12). Since the shaft 142 must be operated from the buttons at the right hand side of the machine, I propose to use for this purpose a shaft 143 connected by a link and arms to the shaft 142, the right hand end of the shaft 143 being connected by means of an arm 144 and link 145 with a lever 146 which is operated by the button 137. This button, therefore, controls the group of wheels at the left of the machine, which we may call the debit wheels. Corresponding to the pawls 141 and shaft 142 at the left of the machine, there is arranged at the right of the machine a series of pawls 147 on a shaft 148 (Fig. 16), which projects directly through the right hand wall of the machine and carries an arm 149 connected by a link 150 to the lever 151 which is operated by depressing the credit total button 138.

In taking this total it is not desired to operate any of the controlling rods which limit the upward movement of the type carriers; and, since there is no operation of the controlling rods, special steps must be taken to withdraw the blank stops P to inoperative positions, (this being ordinarily done by the controlling rods). For this purpose a centrally pivoted lever 152 (Fig. 10) is arranged to have one end depressed upon the operation of either of the buttons 137 or 138. The opposite end of the lever will then push up a link 153 which is connected to a triangular lever 154 pivoted at 155. The pivotal rod 155 extends into the machine (Figs. 6 and 15) and carries arms 156 connected by links 157 to the hooks 39 which transmit the movement of the levers 37 to the plate H for pushing the pins into the card. Accordingly when the shaft 155 is turned and the hooks 39 lifted, there can be no communication of motion to the plate H and no movement of the controlling rods.

Returning to Fig. 10, the triangular lever 154 is connected also to a link 158 which is connected to an arm on a shaft 159 extending across the machine just in the rear of the type carriers and provided with springs 160 (Fig. 6) which, when the shaft is rotated by the pressing of one of the total buttons, force the blank stops P out of operation and allow the type carriers to rise as far as the adding wheels will permit.

The triangular lever 154 is also connected by means of a link 161 to an arm on the end of a shaft 162, the operation of which serves to depress the pawl $u$ and to free the adding wheels so as to allow them to turn back to zero. The connection of the shaft 162 to the pawl $u$ is shown in Figs. 6 and 9, and comprises an arm 163 connected at its outer end by a pin and slot to a link 164. At the same time the pawl $t$ is held back so as to prevent its locking the pawl $u$ down; this holding back being effected by means of a link 165, and an arm 166 serving to swing a shaft 167 which is connected to the several pawls $t$ by mean of arms 168 having pin and slot connections with links 169.

*Frame of the machine.*—Besides the front and side walls referred to, and the rear wall 47, the machine has the rear portion of its base extended laterally, and provided with uprights 186 carrying upper and lower guide rods 187 for the carriage, which consists of uprights 188 connected by diagonal braces 189 and which slides to the right or to the left under the action of the T-lever 96 engaging the pin 87 carried upon the lower bar 190 of the carriage, this bar being provided with ears 191 (Figs. 2 and 6), sliding on the lower shaft 187. The upper cross-bar 192 of the carriage is similarly guided by means of lugs 190 on the upper guide rod 187 and on the rotary shaft $b^2$, and carries the rollers $b$ which are splined on the shaft $b^2$.

*Operation of the machine.*—The foregoing description of the separate mechanisms includes also a description of the operation of each such mechanism. The operation of the machine as a whole is briefly as follows: A card is placed in the pocket A and the handle of the machine is pulled forward and released to permit it to swing back. This operates all of the mechanisms described, and reopens the pocket and feeds the recording sheet one step. The same operation is repeated with one card after another until all the cards belonging to the account in question have been used in this way. The printed sheet is then withdrawn and a new one inserted and the previous operations repeated.

The first effect of the movement of the handle is to pull the outer wall B of the card pocket inward, and to press the top and side edge closures C and C' against the corresponding edges of the card to center it. The plate H is then advanced to press the control rods E against the card, and those rods which find holes in the card (one in each column of rods) advance and release their type carriers J. As soon as the control rods are fully advanced the resetting rod 49 for the type carriers is raised, allowing the carriers to rise under the actions of their several springs K, the amount of upward movement of each type carrier being limited by the engagement of its shoulder L with the head of the control rod of the corresponding column which has been advanced. This brings the several groups of types in proper position relatively to their hammer-followers O. Each type carrier set in position releases the corresponding hammer S from the control of its pawl V. Then as the hammer resetting rod 74 swings backward the hammers are released therefrom and are finally swung against the followers with a sharp spring pressure.

On the backward movement of the handle one of the two groups of adding wheels is thrown to the rear to engage its operating racks 2. Thereafter the hammers are all reset by the forward swing of the resetting rod 74, and the type carriers withdrawn downward by the downward movement of their resetting rod 49. This downward movement of the type carriers swings the sectors $z$, $z^2$ and pushes up the racks 2, the racks of each group moving upward distances corresponding to the amount of movement of the type carriers. The set of adding wheels which has been thrown into operative position with its racks 2 is operated to add the amount last printed to that previously on the adding wheels. The controlling rods E are then withdrawn from the card and the pocket opened.

*Selective mechanism with stationary sheet.*—Instead of printing an item, such as an amount, always with the same set of type, shifting the paper so that the amount is printed at one point or another thereof, the paper may be held stationary, and the apparatus may be designed to print with any one or more of several sets of types arranged opposite different points on the paper. Such an arrangement is shown in Figs. 31, 32 and 33. Three sets of types $186^a$, $187^a$ and $188^a$ are illustrated by way of example, though there may be as many sets as desired. Each set of type may be arranged to print a single subject matter, such as the amount of a bookkeeping item, or to print several subjects, such as all those shown on the card of Fig. 5. They may be used with or without adding wheels, being illustrated, for the sake of simplicity, without such wheels. A single set of control rods E may run from the pocket A and may control one set, $186^a$, of types in the manner previously described, the several sets of types being connected to each other by means of segments $z$, all the unit carriers being fixed on a common shaft $z'$, all the tens carriers on another shaft $z'$, etc., as in Fig. 6. To determine which set of types shall be operated, it is only necessary to provide the slides W, (Fig. 6) corresponding to the several groups of types, with a stop 64 for holding down all the slides of each group, and to have the stops 64 of the several groups connected to shafts $190^a$ which are independent of each other and are controlled by the operator through a button or similar means. The pressing of the button for any set of type will release the hammers therefor, so that the number represented by the type will be printed on the paper $a$ at a point opposite this set, but will not be printed at any other point.

*Primary and secondary adding wheels.*— By breaking the connection between the links 90 and the rods 88 (Fig. 24) which holds them back except when a definite number is registered, the links 90 will both be operated on each operation of the main shaft of the machine, and both sets of adding wheels will register the amount printed. These two sets of adding wheels may then be used as primary and secondary, by taking the total from one of them and turning it back to zero at the end of any definite set of cards (say at the end of each customer's account) while continuing the registration of all the amounts on the other set of adding wheels, so as to secure a grand total of all the secondary totals. The same principle might be used to print a continuous ledger for the use of banks, showing always the amounts entered and the balance.

*Holding down device for type carriers.*

It may be desired to operate the handle of the machine when there is no card in the pocket. Such operation of the handle would, if no means were taken to prevent, set the type carriers at zero and print a line of zeros across the sheet. Means are provided therefore for holding down the type carriers except when there is a card in the pocket, such means being shown separately in Fig. 39, and being indicated also in Fig. 6. Below the last one of the rods E which control the type carriers is a rod 192ª located opposite a recess 193 in the outer wall of the pocket, and pressed forward through an intermediate spiral spring by the movement of the plate H in the same way as the control rods E. If a card is in the pocket it prevents the movement of the rod 192ª, but if there is no card in the pocket the rod 192ª moves forward into the recess 193 and carries with it an arm 194 on a shaft 195 running through the left hand side wall of the machine and carrying on its lower end an arm 196 which is engaged by a link 197 with an arm 198 on the shaft 199 running along just back of the type carriers. The shaft 199 carries a hook 200 extending along all the type carriers and located opposite notches 201 in the rear edges of the type carriers. When the machine is in normal position, the hook is withdrawn from the notches 201. If, however, there is no card in the pocket, and the plate H is pressed forward, then the rod 192 moves forward, and, by means of the mechanism described, swings the hook 200 forward into the notches 201 and prevents the operation of the type carriers. If there is a card in the pocket the hook 200 remains in its inoperative position.

A similar arrangement may be used for holding down the type carriers when the card is in the pocket but out of its proper register with the control rods E.

*Card-control selective mechanism.*

The links 90 which control the shifting or debit and credit mechanism may be controlled directly from the card, as indicated in Figs. 35, 36, 37 and 38. Figs. 35 and 36 show cards similar to those previously described and which may be of any desired type, the peculiarity being that they are provided with special perforations 202 and 203 respectively which are at opposite sides. When the card of Fig. 35 is introduced into the machine, the printing and adding will be in the debit column, and when the card of Fig. 37 is used they will be in the credit column. For this purpose the outer wall of the pocket will be provided with a pair of special recesses 204 (Fig. 37), and opposite these recesses will be supplemental rods 205 similar to the control rods E and pressed forward by the forward movement of the plate H. The cross-bar 12 will be provided, at points corresponding with the positions of the supplemental rods 205, with upward and downward extensions, as shown, carrying each a bell crank lever 206 and a vertical slide 207 serving to lock the corresponding link 90 by fitting into a socket 91 in the upper edge of said link. According as the card in the machine is provided with a perforation 202 or 203, the link 90 at the right or at the left of the machine will be released, and the shifting mechanism will operate as previously described.

The same principle may be applied to a machine which normally prints and adds at one side, and which will continue to print and add at the same side as long as the card has no special shifting perforations; but which will print and add at the other side in case a card is introduced with a proper perforation.

*Reversing selective mechanism.*

In some cases it is necessary to arrange the machine so that for a given card it will print either at the right or at the left at will. For example, supposing the automatic or card-control shifting mechanism of Figs. 35 to 38 to be employed, a broker upon receiving an order, will punch a card such as is shown in Fig. 35, and after using it in his machine will deliver it to the broker with whom the transaction was effected. This second broker will have originally punched a card according to Fig. 36, and printed a sheet therefrom, and will deliver this card to the first broker. Each broker will therefore have a card designed to operate the other broker's machine, and will have to reverse the ordinary action of his own machine. This may be effected by introducing between the rods 205 and the links 90, or at any other suitable points, means for causing the rods 205 to lock or to unlock the links alternately. Or various other devices may be used for reversing the operation.

For example as shown in Figs. 42, 43 and 44, each of the links 90 may be provided with two locking notches 91, one at the upper and one at the lower edge, and the locking slide 207ª may surround the link 90 and be provided with locking portions adapted to enter alternately the upper and lower of the two notches 91. The opening in the slide 207 is approximately the same height as the link 90, so that when the slide 207ᵃ is at its lowest position it locks into the upper notch 91, when in its highest position it locks into the lower notch 91, and in an intermediate position it permits the link 90 to slide freely.

Between the lever 206 and the slide 207ᵃ there is introduced a link 208 connected to an intermediate point of a lever 209, the forward end of which is connected to the slide 207ᵃ, and the rearward end of which is connected by means of a link 210 to an arm 211 on a shaft 212 extending to the outer side of the machine, and there provided with another arm 213 which is connected to the lower end of a push rod 214. This rod is provided near its upper end with teeth 215 adapted to engage a fixed pawl 216, and is drawn upward by a spring 217. In Fig. 42 the push rod is in its highest position and the locking slide 207ᵃ in its lowest position, so that it locks the link 90. The action is the same for both links,—that is to say, they are both locked. Now when a debit card is in the pocket the lever 206 and slide 207ᵃ at the debit side will be lifted in the manner previously described, and the link 90 at the debit side will be free. Or alternatively with a credit card the link 90 at the credit side will be free. If the push rod 214 be pressed to its lower position (Fig. 43) the slide 207ᵃ is thereby turned to its intermediate position, and both the links 90 stand unlocked. In this position of the parts the debit card will operate the lever 206 and lift the slide 207ᵃ on the debit side, and will lock the link 90 on this side, leaving the mechanism on the credit side free to operate,—thus reversing the usual effect of a debit card.

Alternative card centering.

In Figs. 49 and 50 is shown an arrangement which may take the place of the pocket closures previously described. The mechanism in this is operated or controlled by an electric motor 218 the circuit of which terminates in adjustable terminals 219 and 220. The top and left side of the pocket are open as previously described, and the lower and right side of the pocket are provided with spring terminals 221, 222, adapted when the card is accurately centered in the pocket to be pressed outward to make contact with the respective terminals 219 and 220. The spring terminals 221 and 222 are electrically connected with each other, so that the circuit of the motor is only completed if the card is accurately centered in vertical and horizontal directions.

A pocket with immovable walls and without movable centering devices may be used, as illustrated in Fig. 52, the edges being flared to facilitate introduction of a card.

Listing key.

For the purpose of using the machine for listing alone and cutting out the operation of the adding wheels, a pair of listing keys may be provided one controlling the group of adding wheels at each side of the machine. These may be arranged for example as in Fig. 51. The key 227 may be pressed down and held there by the pawl shown, or it may be released and allowed to rise. When it is up the adding wheels are free to operate as usual. When it is down it operates by means of an arm 228 on a shaft 229 carrying an arm 230 to swing to the rear a pin 231 which lies in a slot in an extension 232 of the rod 109, which must be pulled forward to release the group of adding wheels. The movement of the pin 231 to the rear prevents the forward movement of the rod 109, and accordingly prevents the operation of the corresponding set of adding wheels.

Alternative styles of card.

Instead of perforating cards for debit and credit operations as previously described, they may be provided with various other physical differences in size or shape, such for example as the several notches, or cut corners or holes shown at 223, 224, 225 and 226 of Figs. 45 to 48.

Alternative arrangement of control rods.

Instead of operating directly upon the type carriers by means of the same control rods which find the provisions in the card and are pressed forward through such provisions, a different arrangement of control rods may be used passing from front to back through the card and acting upon intermediate rods or other devices which control the type carriers.

Summary of debit and credit arrangements.

The machine includes the use of either one of two principal styles. In the first style the paper is shifted to the right or to the left, and in the second style the paper is stationary, but a double set of types is provided one or the other of which is operated at will.

The control of the debit and credit mechanisms may be effected in a number of ways; (1) by the punching of a particular number in the debtor's or creditor's column or in some other location upon the card, (2) by the use of cards with holes in alternate positions, (3) by the use of cards having or not having a hole therein in a particular position (notches or the like being the equivalent of holes), (4) by various physical differences in the size or the contour of the cards or of the provisions, and (5) manually by suitable keys.

*Summary of arrangement of adding wheels.*

The adding wheels may be grouped in various arrangements such for example as (1) the alternate arrangement, as debit and credit wheels, (2) any alternate arrangement of more than two sets for classifying or separating machines, and (3) as primary and secondary wheels operating sometimes together and sometimes separately as in billing machines.

These are the principal classifications, but the conception is an elastic one permitting of various arrangements and operations such for example as primary debit and credit groups, and a secondary group or groups for adding successive sets of items either debit or credit.

In connection with the adding wheels, keys are provided either for changing from one to the other, for reversing them so that one set of wheels will operate under conditions which would normally cause the operation of the other set, or for throwing out the adding wheels altogether as in the listing mechanism shown in Fig. 51.

In connection with all these arrangements the totals may be taken off at any time. Furthermore if there is no card in the pocket, the handle of the machine may be turned without influencing the adding wheels.

Though I have described with great particularity of detail certain specific embodiments of my invention, yet it is not to be understood therefrom that the invention is restricted to the particular embodiments disclosed. Various modifications thereof in detail and in the arrangement and combination of the parts may be made by those skilled in the art without departure from the invention.

What I claim is:—

1. In apparatus of the class described, a card pocket having a movable wall B, edge closures C and C', and means for transmitting the movement of said wall to said closures to operate them simultaneously with the inward movement of the wall.

2. In apparatus of the class described, a card pocket having a movable wall B, a closure C pivoted at one side of an open edge of said pocket, motion-transmitting devices between said closure and said movable wall for moving said closure inward as the wall moves inward, and means for causing said closure to simultaneously shift laterally over the open edge of the pocket.

3. In apparatus of the class described, a card pocket having a movable wall for gripping the card, in combination with a main shaft adapted to be rotated at each operation of the machine, and a cam actuated by said main shaft to move said wall during the first part of the rotation of the main shaft, and to hold it stationary during the remaining movement of the main shaft.

4. In a machine of the class described, a card pocket having means for gripping the faces and edges of the card, in combination with a main shaft, and a cam device operated during the first part of the rotation of said shaft to actuate said gripping means, and during the latter part of the rotation of said shaft to hold said gripping means.

5. In a machine of the class described, a pocket having a movable outer wall B, and having its upper edge and one side edge open, closures C and C' adapted to grip the corresponding upper and side edge of the card to hold it in place, connecting devices between said movable wall B and said closures C and C' so as to operate them all simultaneously, a rotatable main shaft 4, a pin 18 mounted on an arm of said shaft, a lever 15 connected to said movable wall and having a cam slot 11 in which said pin 18 moves, the shape of said cam slot being such as to cause first a closing movement of said wall B and closures C and C' and thereafter to hold said parts closed.

6. In a machine of the class described, a series of movable type carriers, a pocket for carrying a perforated card, a series of control rods E supported at their rear ends and carrying stops to limit the movement of the type carriers and adapted to project at their forward ends into the card pocket, a plate H which is movable in a direction to force the rods into the pocket and through the card and a spring G engaging and pressing said plate in said direction.

7. In a machine of the class described, control rods, means for pressing said control rods against a card, a main shaft having an arm, a pin 18 carried on said arm, a lever 43 connected to said pressing means, and having a cam slot 44 in which said pin 18 travels.

8. In a machine of the class described, holding means for holding a card in position, control rods, pressing means for pressing said control rods against said card, a main shaft, and mechanism controlled by said shaft for first operating said holding means to grip the card, and thereafter operating said pressing means to press the rods against the card.

9. In a machine of the class described, holding means for a card, control rods, pressing means for pressing said control rods against said card, a main shaft 4, a lever 15 operating said holding means to grip the card, a lever 43 operating said pressing means, and cam devices between said shaft and said respective levers 15 and 43 for operating first the former and then the latter.

10. In a machine of the class described, a pocket having a movable wall, rods 11 supported in the machine and reciprocated to move said wall, a series of control rods, a plate H adapted to be reciprocated to operate said control rods, and supported and guided on said rods 11.

11. In a machine of the class described, control rods adapted to pass through perforations in a card, stops shifted to and from operative position by the movement of said rods, a type carrier adapted when moved to carry a series of type in succession past the printing position, and having a shoulder adapted to engage said stops to limit the movement of said carrier to hold it with a determined type in printing position, and a "blank" stop for normally preventing any movement of said carrier when no one of said rods is moved.

12. In a machine of the class described, control rods adapted to pass through perforations in a card, stops shifted to and from operative position by the movement of said rods, a type carrier adapted when moved to carry a series of types in succession past the printing position, and having a shoulder adapted to engage said stops to limit the movement of said carrier to hold it with a determined type in printing position, a rod 49 adapted to hold a number of such carriers in their starting positions, and a spring K carried by each of said carriers for operating them independently of each other when said rod 49 is shifted from its original position.

13. In a machine of the class described, the combination with means for holding a card and means for clamping the same, of control rods, means for pressing said control rods against the card, type carriers, means for causing a movement of said type carriers to positions determined by the control rods, a main shaft, and means controlled by the rotation of said shaft for operating first said holding means, second said control rods, and third said type carriers.

14. Mechanism controlled by a perforated card for reproducing an item, including in combination a series of types adapted to be moved to operative positions by corresponding perforations in the card, vertical feeding mechanism adapted to engage a recording sheet in position to be printed on by said types and means for causing said types to print at the right and at the left of said sheet alternatively while maintaining the engagement of said feeding mechanism with said sheet.

15. Mechanism controlled by a perforated card for reproducing an item, including in combination a series of types adapted to be moved to operative positions by corresponding perforations in the card, a carriage carrying a listing sheet wider than the items to be listed and in position to be printed on by said types, and vertical feeding mechanism adapted to engage said sheet, said carriage arranged to shift said sheet to the right or the left to correspondingly shift the point thereon at which an item is printed while maintaining the engagement of said feeding mechanism with said sheet.

16. Mechanism controlled by a perforated card for reproducing an item, including in combination a series of types adapted to be moved to operative positions when there are corresponding perforations in the card, and means controlled by perforations in the card for automatically shifting the point of the sheet at which an item shall be printed to the right or to the left.

17. Means controlled by a perforated card for reproducing an item, including in combination a series of types adapted to be moved to operative positions when there are corresponding perforations in the card, means controlled by perforations in the card for automatically shifting the point of the sheet at which an item shall be printed to the right or to the left, and also hand controlled means for so shifting such point.

18. The combination with a card having a space thereon punched to indicate one of the parties to an account, of a reproducing machine adapted to print at one side when said punchings correspond to a particular party, and at the other side when they do not correspond to said party.

19. The combination with means for printing an item at one point or another of a sheet under the control of perforated cards, of means for determining the point at which the printing shall take place, said determining means being controlled manually.

In witness whereof, I have hereunto signed my name in the presence of two subscribing witnesses.

JOHN ROYDEN PEIRCE.

Witnesses:
  DOMINGO A. USINA,
  FRED WHITE.